US012733064B2

(12) United States Patent
Schliwa-Bertling et al.

(10) Patent No.: US 12,733,064 B2
(45) Date of Patent: Sep. 8, 2026

(54) RADIO RESOURCE CONTROL FOR MULTI-SIM

(71) Applicant: Telefonaktiebolaget LM Ericsson (PUBL), Stockholm (SE)

(72) Inventors: Paul Schliwa-Bertling, Ljungsbro (SE); Icaro Leonardo Da Silva, Solna (SE); Lian Araujo, Solna (SE); Alessio Terzani, Stockholm (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 376 days.

(21) Appl. No.: 18/552,353

(22) PCT Filed: Mar. 29, 2022

(86) PCT No.: PCT/IB2022/052890
§ 371 (c)(1),
(2) Date: Sep. 25, 2023

(87) PCT Pub. No.: WO2022/208348
PCT Pub. Date: Oct. 6, 2022

(65) Prior Publication Data

US 2024/0179790 A1 May 30, 2024

Related U.S. Application Data

(60) Provisional application No. 63/167,177, filed on Mar. 29, 2021.

(51) Int. Cl.
*H04W 76/27* (2018.01)
*H04W 68/02* (2009.01)
*H04W 88/06* (2009.01)

(52) U.S. Cl.
CPC .......... *H04W 76/27* (2018.02); *H04W 68/02* (2013.01); *H04W 88/06* (2013.01)

(58) Field of Classification Search
CPC ..... H04W 76/27; H04W 68/02; H04W 88/06; H04W 76/16; H04W 76/15
(Continued)

(56) References Cited

U.S. PATENT DOCUMENTS

2022/0295591 A1 * 9/2022 Aggarwal ............ H04W 76/30

FOREIGN PATENT DOCUMENTS

WO 2020034901 A1 2/2020
WO 2020186092 A1 9/2020
WO 2022084949 A1 4/2022

OTHER PUBLICATIONS

PCT International Search Report issued for International application No. PCT/IB2022/052890—Jun. 30, 2022.
(Continued)

*Primary Examiner* — Huy C Ho
(74) *Attorney, Agent, or Firm* — Baker Botts L.L.P.

(57) ABSTRACT

According to some embodiments, a method is performed by a wireless device operating in both a first network and a second network (e.g., the wireless device is in an idle/inactive state in the second network). The method comprises determining a pattern for performing procedures (e.g., a set of idle/inactive mode procedures) in the second network, and upon transition of the wireless device from an inactive/idle state to a connected state in the first network, transmitting an indication of the determined pattern to the first network.

26 Claims, 20 Drawing Sheets

(58) Field of Classification Search
USPC .......................................................... 370/329
See application file for complete search history.

(56) References Cited

OTHER PUBLICATIONS

PCT Written Opinion of the International Searching Authority issued for International application No. PCT/IB2022/052890—Jun. 30, 2022.

* cited by examiner

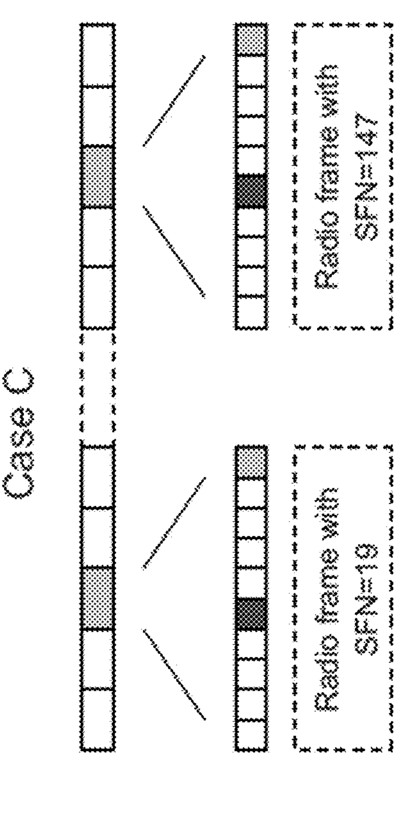
Case C
Radio frame with SFN=19
Radio frame with SFN=147
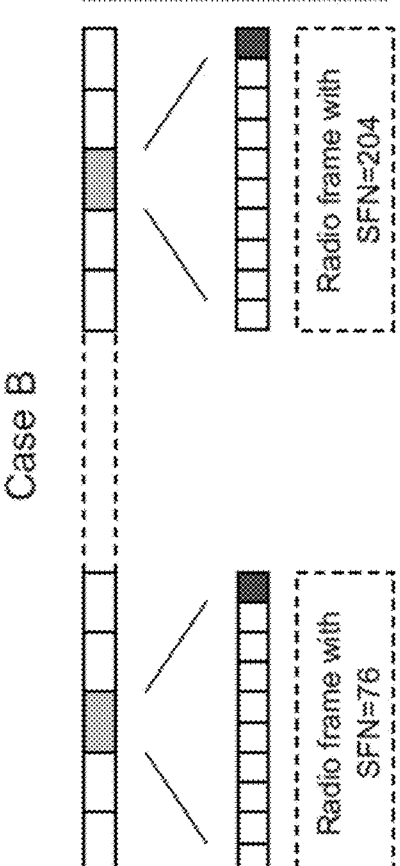
Case B
Radio frame with SFN=76
Radio frame with SFN=204
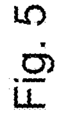
Fig. 5

243a Network
243b Network
200
201 Processor
205 Input/Output Interface
209 RF Interface
211 Network Connection Interface
213 Power Source
202 Bus
215 Memory
217 RAM
219 ROM
221 Storage Medium
223 Operating System
225 Application Programs
227 Data
231 Communication Subsystem
233 Transmitter
235 Receiver

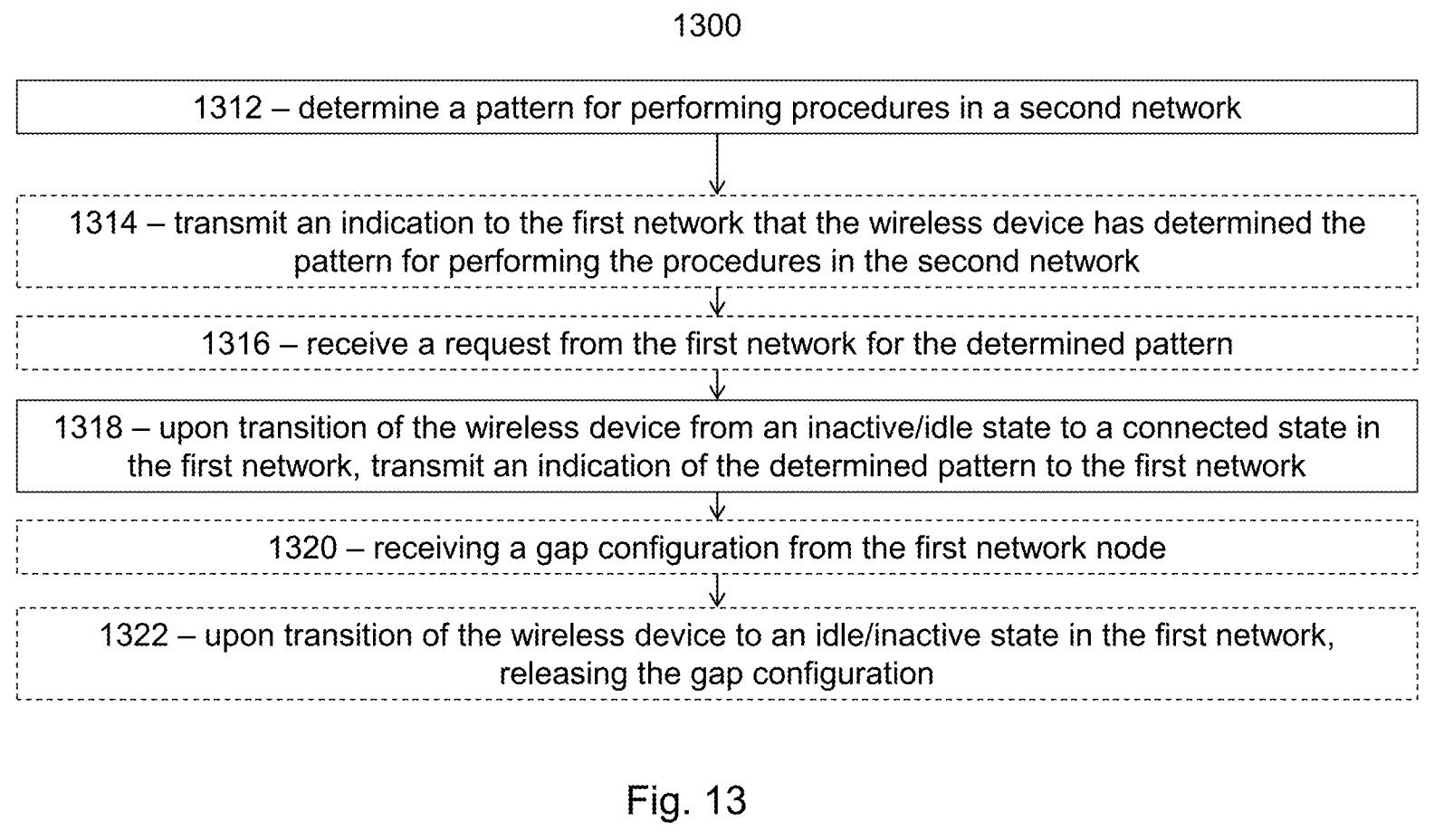

1300

1312 – determine a pattern for performing procedures in a second network

1314 – transmit an indication to the first network that the wireless device has determined the pattern for performing the procedures in the second network 1316 – receive a request from the first network for the determined pattern 1318 – upon transition of the wireless device from an inactive/idle state to a connected state in the first network, transmit an indication of the determined pattern to the first network 1320 – receiving a gap configuration from the first network node 1322 – upon transition of the wireless device to an idle/inactive state in the first network, releasing the gap configuration

Fig. 13

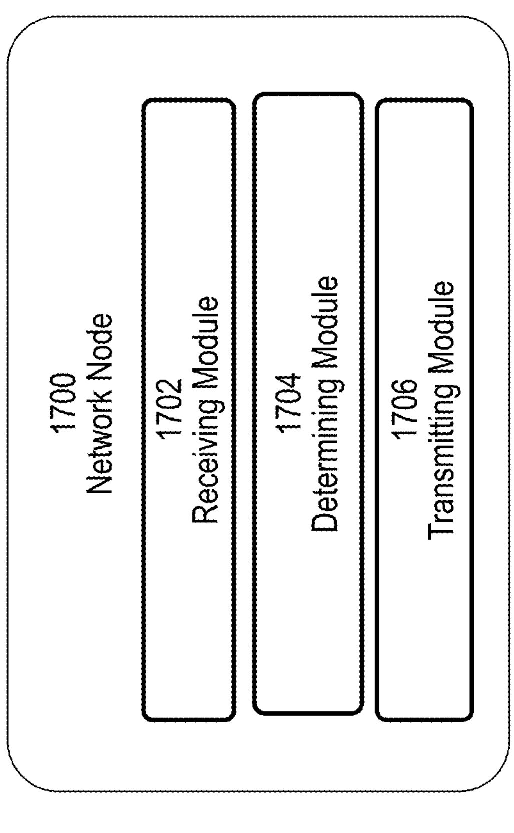
Fig. 15

RADIO RESOURCE CONTROL FOR MULTI-SIM

PRIORITY

This nonprovisional application is a U.S. National Stage Filing under 35 U.S.C. § 371 of International Patent Application Serial No. PCT/IB2022/052890 filed Mar. 29, 2022 and entitled "RADIO RESOURCE CONTROL FOR MULTI-SIM" which claims priority to U.S. Provisional Patent Application No. 63/167,177 filed Mar. 29, 2021, both of which are hereby incorporated by reference in their entirety.

TECHNICAL FIELD

Embodiments of the present disclosure are directed to wireless communications and, more particularly, to radio resource control (RRC) state transitions for multi-SIM user equipment (UEs).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Some wireless devices may operate with more than one subscriber identify module (SIM). This may be referred to as multi-SIM operation. Operating with multiple SIMs may present several challenges. The network operations described below provide background information for understanding these challenges.

A user equipment (UE) is either in RRC_CONNECTED state or in RRC_INACTIVE state when a radio resource control (RRC) connection has been established. If this is not the case, i.e., no RRC connection is established, the UE is in RRC_IDLE state. The RRC states can further be characterized as follows.

For RRC_IDLE, a UE specific discontinuous reception (DRX) may be configured by upper layers. UE controlled mobility is based on network configuration. The UE monitors short messages transmitted with paging radio network temporary identifier (P-RNTI) over downlink control information (DCI), monitors a paging channel for core network (CN) paging using fifth generation (5G) S-temporary mobile subscriber identity (5G-S-TMSI), performs neighboring cell measurements and cell (re-)selection, acquires system information (SI) and can send SI request (if configured), and performs logging of available measurements together with location and time for logged measurement configured UEs.

For RRC_INACTIVE, a UE specific DRX may be configured by upper layers or by the RRC layer. UE controlled mobility is based on network configuration. The UE stores the UE inactive access stratum (AS) context. A radio access network (RAN)-based notification area is configured by RRC layer. The UE monitors short messages transmitted with P-RNTI over DCI, monitors a paging channel for CN paging using 5G-S-TMSI and RAN paging using full-RNTI, performs neighboring cell measurements and cell (re-)selection, performs RAN-based notification area updates periodically and when moving outside the configured RAN-based notification area; acquires system information and can send SI request (if configured), and performs logging of available measurements together with location and time for logged measurement configured UEs.

For RRC_CONNECTED, the UE stores the AS context. Unicast data is transferred to/from the UE. At lower layers, the UE may be configured with a UE specific DRX. UEs supporting carrier aggregation (CA) may use one or more SCells, aggregated with the SpCell, for increased bandwidth. UEs supporting dual connectivity (DC) use one secondary cell group (SCG), aggregated with the master cell group (MCG), for increased bandwidth. Network controlled mobility is within NR and to/from E-UTRA. The UE monitors short messages transmitted with P-RNTI over DCI if configured, monitors control channels associated with the shared data channel to determine if data is scheduled for it, provides channel quality and feedback information, performs neighboring cell measurements and measurement reporting, acquires system information, and performs immediate minimization of drive test (MDT) measurement together with available location reporting.

FIG. 1 illustrates an overview of UE RRC state machine and state transitions in NR. A UE has only one RRC state in NR at any one time.

FIG. 2 illustrates an overview of UE state machine and state transitions in NR as well as the mobility procedures supported between NR/5GC E-UTRA/EPC and E-UTRA/5GC.

The network includes DRX and paging in RRC_IDLE and RRC_INACTIVE. Paging allows the network to reach UEs in RRC_IDLE and in RRC_INACTIVE state through Paging messages, and to notify UEs in RRC_IDLE, RRC_INACTIVE and RRC_CONNECTED state of system information change and ETWS/CMAS indications through short messages. Both paging messages and short messages are addressed with P-RNTI on physical downlink control channel (PDCCH), but while the former is sent on paging control channel (PCCH), the latter is sent over PDCCH directly.

While in RRC_IDLE, the UE monitors the paging channels for CN-initiated paging. In RRC_INACTIVE the UE also monitors paging channels for RAN-initiated paging. A UE need not monitor paging channels continuously though. Paging DRX is defined where the UE in RRC_IDLE or RRC_INACTIVE is only required to monitor paging channels during one paging occasion (PO) per DRX cycle (see details in TS 38.304). The paging DRX cycles are configured by the network.

For CN-initiated paging, a default cycle is broadcast in system information, and a UE specific cycle can be configured via non-access stratum (NAS) signalling. For RAN-initiated paging, a UE-specific cycle is configured via RRC signalling.

The UE uses the shortest of the DRX cycles applicable, i.e., a UE in RRC_IDLE uses the shortest of the first two cycles above, while a UE in RRC_INACTIVE uses the shortest of the three.

The POs of a UE for CN-initiated and RAN-initiated paging are based on the same UE ID, resulting in overlapping POs for both. The number of different POs in a DRX cycle is configurable via system information and a network may distribute UEs to those POs based on their IDs.

In general, DRX is characterized by the following parameters. The on-duration is the duration that the UE waits for, after waking up, to receive PDCCHs. If the UE successfully decodes a PDCCH, the UE stays awake and starts the inactivity timer.

The inactivity-timer is the duration that the UE waits to successfully decode a PDCCH, from the last successful decoding of a PDCCH, failing which it can go back to sleep. The UE shall restart the inactivity timer following a single successful decoding of a PDCCH for a first transmission only (i.e., not for retransmissions).

The retransmission-timer is the duration until a retransmission can be expected.

The cycle specifies the periodic repetition of the on-duration followed by a possible period of inactivity (see FIG. 3 below).

The active-time is the total duration that the UE monitors PDCCH. This includes the "on-duration" of the DRX cycle, the time UE is performing continuous reception while the inactivity timer has not expired, and the time when the UE is performing continuous reception while waiting for a retransmission opportunity. An example is illustrated in FIG. 3.

FIG. 3 is a timing diagram illustrating a DRX cycle. As illustrated, the DRX cycle includes an onDuration followed by an opportunity for DRX. The UE monitors for PDCCH during the onDuration.

The UE may use DRX in RRC_IDLE and RRC_INACTIVE state to reduce power consumption. The UE monitors one paging occasion (PO) per DRX cycle. A PO is a set of PDCCH monitoring occasions and can consist of multiple time slots (e.g., subframe or OFDM symbol) where paging DCI can be sent. One paging frame (PF) is one radio frame and may contain one or multiple PO(s) or starting point of a PO. In multi-beam operations, the UE assumes that the same paging message and the same short message are repeated in all transmitted beams and thus the selection of the beam(s) for the reception of the paging message and short message is up to UE implementation. The paging message is the same for both RAN initiated paging and CN initiated paging. An example is illustrated in FIG. 4.

FIG. 4 is a timing diagram illustrating paging occasions in a radio frame. The PF and PO for paging are determined by the following formulae. The system frame number (SFN) for the PF is determined by (SFN+PF_offset) mod T=(T div N)*(UE_ID mod N). Index (i_s), indicating the index of the PO is determined by i_s=floor (UE_ID/N) mod Ns.

A PO associated with a PF may start in the PF or after the PF. The PDCCH monitoring occasions for a PO can span multiple radio frames. When SearchSpaceId other than 0 is configured for paging-SearchSpace the PDCCH monitoring occasions for a PO can span multiple periods of the paging search space.

The following parameters are used for the calculation of PF and i_s above:

T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied).

N: number of total paging frames in T

Ns: number of paging occasions for a PF

PF_offset: offset used for PF determination

UE_ID: 5G-S-TMSI mod 1024

Parameters Ns, nAndPagingFrameOffset, nrofPDCCH-MonitoringOccasionPerSSB-InPO, and the length of default DRX Cycle are signaled in SIB1. The values of N and PF_offset are derived from the parameter nAndPagingFrameOffset. The parameter first-PDCCH-MonitoringOccasionOfPO is signaled in SIB1 for paging in initial downlink (DL) bandwidth part (BWP). For paging in a DL BWP other than the initial DL BWP, the parameter first-PDCCH-MonitoringOccasionOfPO is signaled in the corresponding BWP configuration.

For example, in case B of FIG. 5, one out of every 4 radio frames is used for paging, using one subframe in each of the radio frames. In case C of FIG. 5, two subframes in each radio frame are used for paging, i.e. Ns=2. All the shaded subframes can be used for paging; the darker ones are applicable for the UE with the indicated identity.

FIG. 6 describes the UE triggered transition from RRC_INACTIVE to RRC_CONNECTED for UE context retrieval success. As illustrated, at step 1 the UE resumes from RRC_INACTIVE, providing the I-RNTI, allocated by the last serving gNB.

At step 2, the gNB, if able to resolve the gNB identity contained in the I-RNTI, requests the last serving gNB to provide UE Context data. At step 3, the last serving gNB provides UE context data.

At steps 4 and 5, the gNB and UE completes the resumption of the RRC connection. User data may also be sent in step 5 if the grant allows.

At step 6, if loss of DL user data buffered in the last serving gNB shall be prevented, the gNB provides forwarding addresses. At steps 7 and 8, the gNB performs path switch. At step 9, the gNB triggers the release of the UE resources at the last serving gNB.

After step 1 above, when the gNB decides to use a single RRC message to reject the Resume Request right away and keep the UE in RRC_INACTIVE without any reconfiguration (e.g., as described in the two examples below), or when the gNB decides to setup a new RRC connection, SRB0 (without security) is used. Conversely, when the gNB decides to reconfigure the UE (e.g., with a new DRX cycle or RNA) or when the gNB decides to push the UE to RRC_IDLE, SRB1 (with integrity protection and ciphering as previously configured for that SRB) shall be used. SRB1 can only be used once the UE Context is retrieved, i.e., after step 3.

3GPP is currently studying how to best support UE's that can manage two or more simultaneous subscriptions (also referred to as multi-SIM). A single UE is capable of having two or more subscription credentials and basically acting as two UE's within one device/hardware entity. Even though mobile terminals with that property exist, most operations are not optimized because there is no specific standardized support for multi-SIM, e.g., to make it easier for UE's to manage two or more subscriptions simultaneously.

Several aspects may be addressed. For example, a UE may need to be provided support to easier switch between states related to utilization of subscription 1 (USIM1, connecting to a PLMN1) and states related to utilization or communication using subscription 2 (USIM2, connecting to PLMN2) as such states may be dependent, e.g., CM-Connected in PLMN1 and PLMN2. Such switching may be straightforward, or maybe not even necessary, if the UE has the capability of communicating simultaneously towards two networks, using USIM1 and 2 simultaneously. For this to work, there may be a need for at least dual receiver and transmitter chains, that frequencies that are used towards both networks do not cause interference to each other and that radio separation is good enough to not cause, e.g., IM effects in the device. Other aspects that can be addressed by standard is signaling that enables a UE that cannot simultaneously communicate with, e.g., two or more networks, to at least signal a network that it is leaving, or becoming unreachable for that network.

A common scenario is a UE in RRC CONNECTED in Network A that needs to perform operations in Network B, e.g., listen to paging, SIB acquisition, cell reselection. etc. Such scenario may be further divided into short absence (e.g., when the UE listens to paging in network B and switches back to Network A), and long absence (e.g., when the UE initiates a service in network B and thus may not shortly switch back to Network A).

A short UE absence may be handled by negotiation of short interruptions to the connection of the UE to Network A while it performs operations in Network B. During this absence of the UE in Network A, it is usually expected that the UE will be kept in RRC CONNECTED in Network A. Eventually Network A could decide to move the UE to RRC IDLE or RRC INACTIVE as a result of the negotiation.

A short UE absence may be handled by a UE indication that it is leaving for a short time. The UE can use the release preference indication from UE power saving mechanism to indicate leaving (e.g., if it would expect to be moved to IDLE it could send such indication to Network A).

```
ReleasePreference-r16 ::=        SEQUENCE {
   preferredRRC-State-r16           ENUMERATED {idle, inactive, connected,
outOfConnected}
}
```

A long UE absence may be handled by a UE indication that it is leaving for a long period. Network A may still keep the UE context until a certain timer expires.

There currently exist certain challenges. For example, multi-USIM devices have been more and more popular in different countries. The user may have both a personal and a business subscription in one device or has two personal subscriptions in one device for different services (e.g., use one individual subscription and one "family circle" plan). However, support for multi-USIM within a device is currently handled in an implementation-specific manner without any support from 3GPP specifications, resulting in a variety of implementations and UE behaviors most of the time sub-optimal.

UE's that are registered to more than one network/PLMNs need to be able to receive paging message from more than one network. Dependent on UE capabilities (e.g., Rx and Tx capabilities) this can create situations in which a UE is occupied listening to pages from one network while pages from other networks also may be sent. Further, UE's may be actively communicating with one network while another network pages the UE. If a user switches between communications towards different networks, situations may occur when a UE/user can no longer receive data from a network with which it was recently communicating. Such situations can have a negative impact on performance, e.g., if pages are sent and not properly received, or if users are scheduled while not being able to receive communication.

Particular problems exist when a multi-SIM UE with a single Rx processing unit/chain or when all Rx processing units/chains are configured to be used in one of the networks/PLMN can only receive transmissions from one PLMN at a time. If the UE is in RRC_CONNECTED in a first PLMN (e.g., PLMN1 associated to USIM1) and in RRC_IDLE (or RRC_INACTIVE) in PLMN2 (e.g., associated to USIM2), such a UE would thus need to be able to maintain being reachable by any of the two PLMNs (or two USIMs), i.e., need to be able to perform actions in RRC_CONNECTED (e.g., PDCCH monitoring, measurements according to MeasConfig, CSI measurements and reporting, etc.) in PLMN1 while performing IDLE/INACTIVE actions in PLMN2 such as listen for paging in PLMN2, perform cell reselection measurements, associated measurements and evaluations, acquire system information (e.g., upon cell reselection or modification indications), perform registration area updates (e.g., upon entering a new registration area), or RAN area updates (e.g., if in RRC_INACTIVE in PLMN2 and performs cell reselection to an area not in the Configured RAN Area Configuration).

In the situations when a UE is communicating using, e.g., USIM1 towards PLMN1, it is in CM_CONNECTED and RRC_CONNECTED, there is no obvious way how a UE should be able to maintain the operations listed above, in PLMN2, associated to connectivity using subscription on USIM2. 3GPP is currently discussing how a multi-SIM UE, i.e., having SIM cards from a PLMN-A and PLMN-B can be in RRC_CONNECTED in PLMN-A while in RRC_IDLE and/or RRC_INACTIVE in PLMN-B, wherein the UE should be able to perform RRC_IDLE/RRC_INACTIVE procedures in PLMN-B such as paging monitoring, cell reselection, etc.

Some proposals include a UE capable of operating with multiple USIMs (at least two) that performs the following actions. If the UE is in CONNECTED in a first PLMN (associated with the first USIM) and in IDLE/INACTIVE in a second PLMN (associated with the second USIM), the UE determines a periodic pattern for performing a set of IDLE/INACTIVE mode procedures in the second PLMN. The UE transmits a first indication with information on the periodic pattern to the first PLMN. The UE then monitors the occurrence of at least one idle event in the second PLMN and transmits a second indication to the first PLMN upon the occurrence of the event.

Using the proposal, the serving gNodeB the UE is connected to in PLMN-A (e.g., the gNodeB associated to the UE's PCell) is aware of possible gaps the UE requires to perform these IDLE and/or INACTIVE procedures in PLMN-B. Thus, based on the reported information, the serving gNodeB does not schedule the UE during those periods.

However, while performing the IDLE and/or INACTIVE procedures in PLMN-B. according to a certain pattern, the PLMN-A may decide to release (to IDLE) or suspend (to INACTIVE state) the UE. In addition, while in IDLE or INACTIVE, the UE may move away from the coverage of the serving gNodeB in PLMN-A (from a cell A1 from the source gNodeB of PLMN-A to a cell A2 from a target gNodeB of PLMN-A). If that happens, after some time the UE may transition to CONNECTED again with PLMN-A and connects to the target gNodeB (which might be the same or not as the last serving gNodeB the UE was suspended or released), the target gNodeB would not be aware of the gaps the UE requires for performing the actions in PLMN-B so that the target gNodeB may schedule the UE in these periods the UE is not listening to PDCCH, which would lead to scheduling failures and unnecessary network transmissions (because the UE is not listening).

SUMMARY

Based on the description above, certain challenges currently exist with multi-SIM user equipment (UEs). Certain aspects of the present disclosure and their embodiments may provide solutions to these or other challenges. For example, particular embodiments ensure that the UE in MU-SIM operation is synchronized with the first public land mobile network (PLMN) (e.g., PLMN-1) concerning the gaps the UE uses for performing actions in the second PLMN, during state transition procedures such as release (CONNECTED to IDLE), setup (IDLE to CONNECTED), suspend (CONNECTED to INACTIVE) and resume (INACTIVE to CONNECTED) in the first PLMN.

Particular embodiments enable both the UE and the network node (e.g., target gNodeB in a Next Generation Radio Access Network—NG-RAN, for the first PLMN) to have up to date information (e.g., periodic pattern) regarding periods and/or gaps the UE requires to perform procedures in a second PLMN, when the UE is a multi-SIM UE and when the UE transitions between IDLE/INACTIVE and CONNECTED in one of the PLMNs it is connected to, e.g., the first PLMN.

A first set of embodiments are UE-centric (e.g., UE releases periodic pattern information upon entering IDLE/INACTIVE, and upon transition to CONNECTED it provides it to the network), but may also have some network aspects.

A second set of embodiments are network-centric (e.g., both UE and network store the periodic pattern upon the UE entering IDLE/INACTIVE and restores the periodic pattern upon transition to CONNECTED).

According to some embodiments, a method is performed by a wireless device operating in both a first network and a second network (e.g., the wireless device is in an idle/inactive state in the second network). The method comprises determining a pattern for performing procedures (e.g., a set of idle/inactive mode procedures) in the second network, and upon transition of the wireless device from an inactive/idle state to a connected state in the first network, transmitting an indication of the determined pattern to the first network.

In particular embodiments, the method further comprises receiving a gap configuration from the first network node. The gap configuration is based on the pattern. Receiving the gap configuration may comprise receiving one of a RRC resume, RRC setup, and RRC reconfiguration message.

In particular embodiments, the method further comprises, upon transition of the wireless device to an idle/inactive state in the first network, releasing the gap configuration.

In particular embodiments, the method further comprises transmitting an indication to the first network that the wireless device has determined the pattern for performing the procedures in the second network and receiving a request from the first network for the determined pattern.

In particular embodiments, transmitting the indication of the determined pattern comprises transmitting a radio resource control (RRC) message. The RRC message may comprise one of a RRC resume request, RRC setup request, RRC resume complete, RRC setup complete message, and UE assistance information.

In particular embodiments, the determined pattern is based on one or more of the following procedures in the second network: paging frames and paging occasions configured for the wireless device, discontinuous reception (DRX) cycle, periods for performing measurements, and periodic registration area updates. The determined pattern may comprise a set of time domain windows.

In particular embodiments, the wireless device comprises a multi-SIM wireless device.

According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method performed is by a first network node in a first network serving a first wireless device, wherein the wireless device is also operating in a second network. The method comprises receiving, from the wireless device transitioning from an idle/inactive state to a connected state in the first network, a pattern for performing procedures (e.g., a set of idle/inactive mode procedures) in the second network and upon the wireless device transitioning to an idle/inactive state in the first network, storing the pattern.

In particular embodiments, the method further comprises determining a gap configuration based on the pattern and transmitting the gap configuration to the wireless device. Transmitting the gap configuration may comprise transmitting one of a RRC resume, RRC setup, and RRC reconfiguration message.

In particular embodiments, storing the pattern comprises storing the pattern in an access stratum (AS) context for the wireless device.

In particular embodiments, receiving the pattern comprises receiving one of a RRC resume request, RRC setup request, RRC resume complete, RRC setup complete message, and RRC UE assistance information.

In particular embodiments, the method further comprises, upon the wireless device connecting to a second network node in the first network, transmitting the pattern to the second network node. Transmitting the pattern to the second network node may comprise transmitting a retrieve context response message.

In particular embodiments, the method further comprises transmitting the pattern to a core network node. Transmitting the pattern to the core network node may comprise transmitting one of a path switch request. RRC inactive transition report and a context release request.

In particular embodiments, the pattern is based on one or more of the following procedures in the second network: paging frames and paging occasions configured for the wireless device. DRX cycle, periods for performing measurements, and periodic registration area updates.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments enable the UE in MU-SIM operation with a first PLMN and a second PLMN to use gaps for performing operations in the second PLMN that are also considered by the first PLMN, when state transitions occur with the first PLMN, so that UE stops listening to the first PLMN at the times the first PLMN is also not trying to schedule the UE. From the UE's perspective, it enables the UE to not reduce its data rates by assuming gaps not being used by the first PLMN, even if the UE is performing state transitions with the first PLMN. At the network side, at the first PLMN, the method allows the first PLMN to keep performing state transitions for a UE operating in MU-SIM, and at the same time, being able to be up to date concerning the needed gaps for UE's operations with the second PLMN.

This enables the network node (e.g., serving gNodeB or target gNodeB in NG-RAN) to have up to date information (e.g., periodic pattern) regarding periods and/or gaps the UE requires to perform procedures in a second PLMN, whenever the multi-SIM UE transitions between IDLE/INACTIVE and CONNECTED in one of the PLMNs.

BRIEF DESCRIPTION OF THE DRAWINGS

For a more complete understanding of the disclosed embodiments and their features and advantages, reference is now made to the following description, taken in conjunction with the accompanying drawings, in which:

FIG. 5 illustrates paging subframes;

FIG. 13 is flowchart illustrating an example method in a wireless device, according to certain embodiments;

FIG. 15 illustrates a schematic block diagram of a wireless device and a network node in a wireless network, according to certain embodiments;

DETAILED DESCRIPTION

Figure 1:
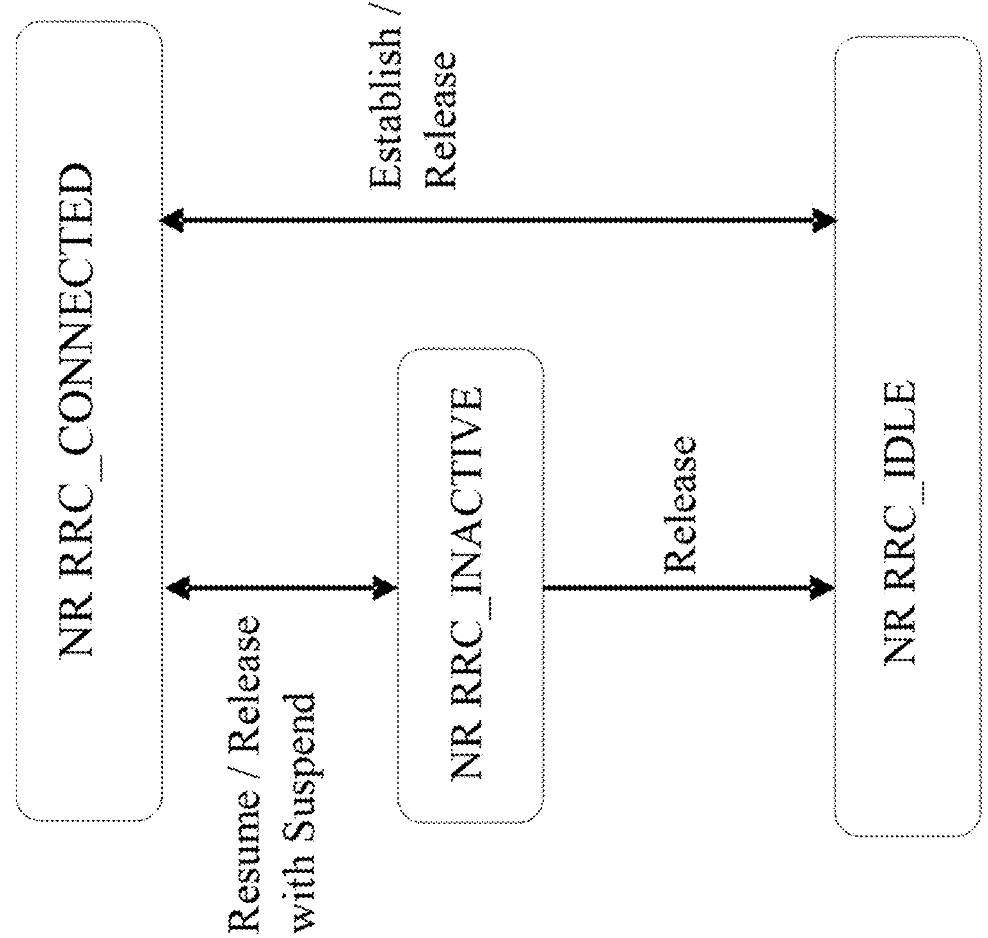
FIG. 1 illustrates an overview of UE RRC state machine and state transitions in NR.
Figure 2:
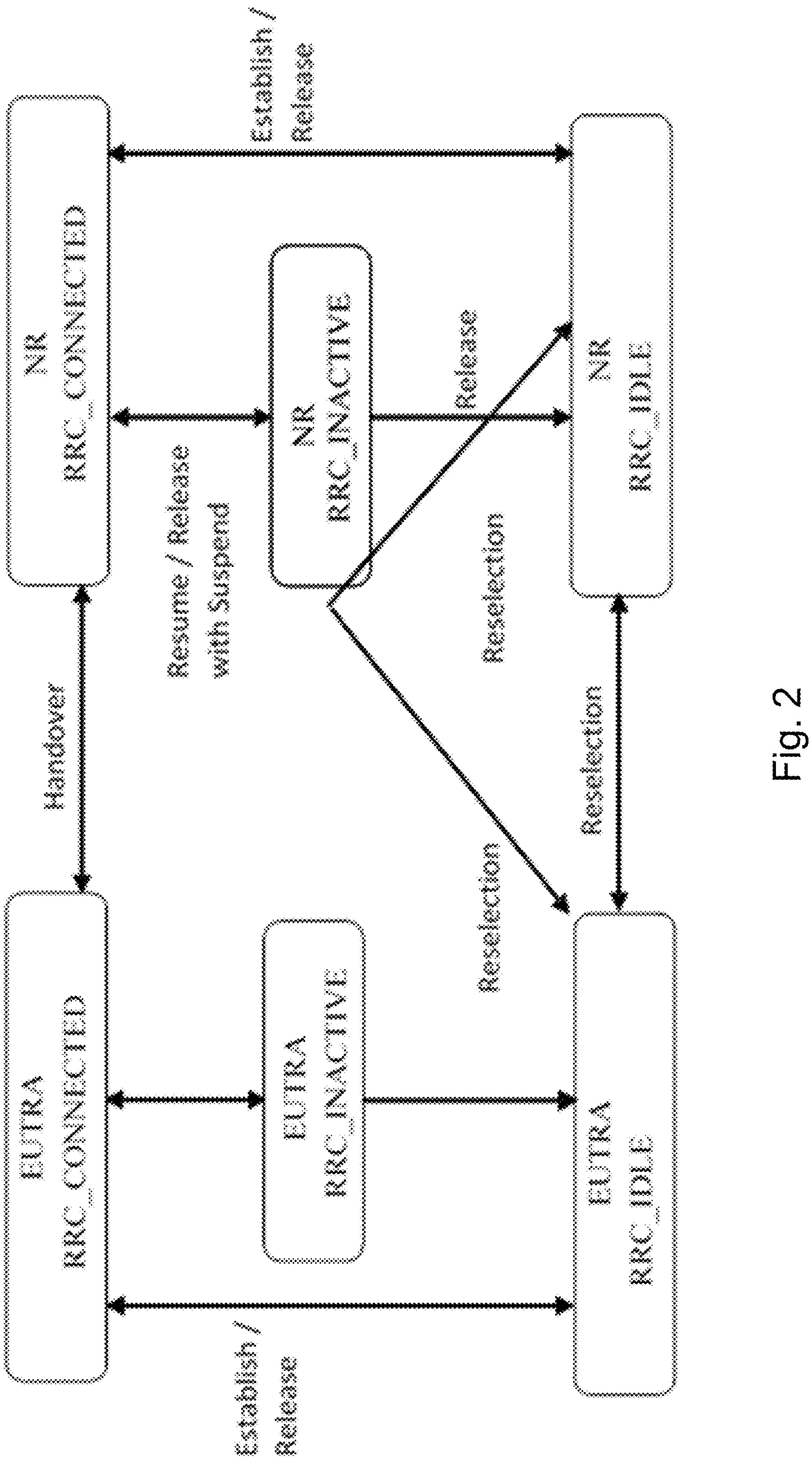
FIG. 2 illustrates an overview of UE state machine and state transitions in NR as well as the mobility procedures supported between NR/5GC E-UTRA/EPC and E-UTRA/5GC.
Figure 3:
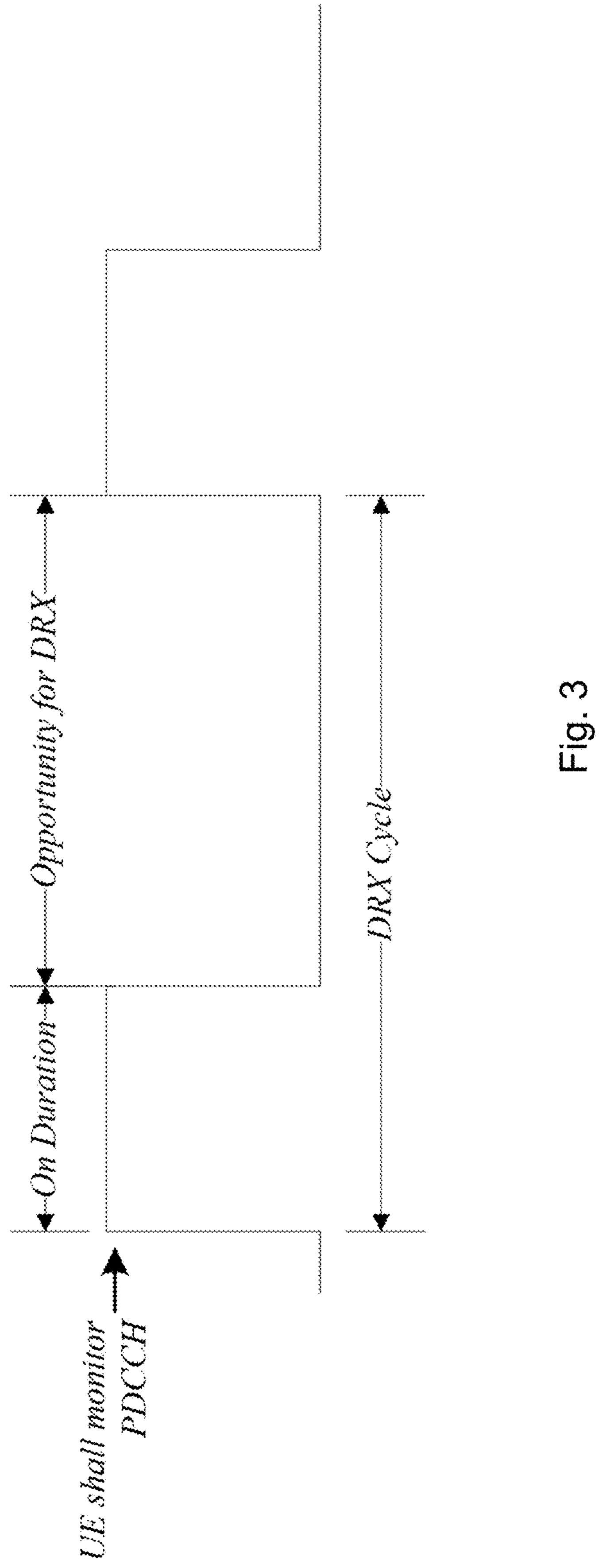
FIG. 3 is a timing diagram illustrating a discontinuous reception (DRX) cycle.
Figure 4:
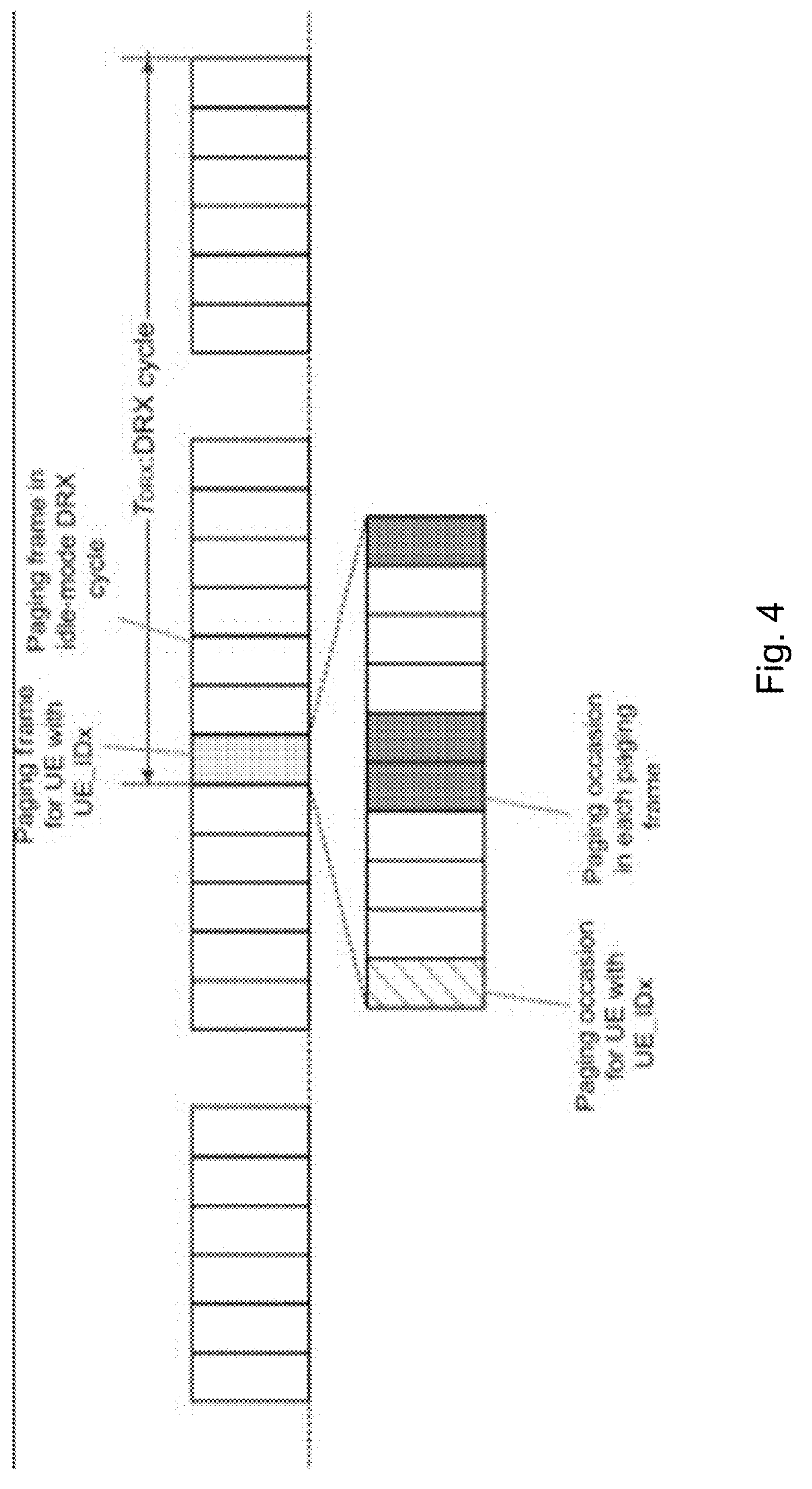
FIG. 4 is a timing diagram illustrating paging occasions in a radio frame.
Figure 6:
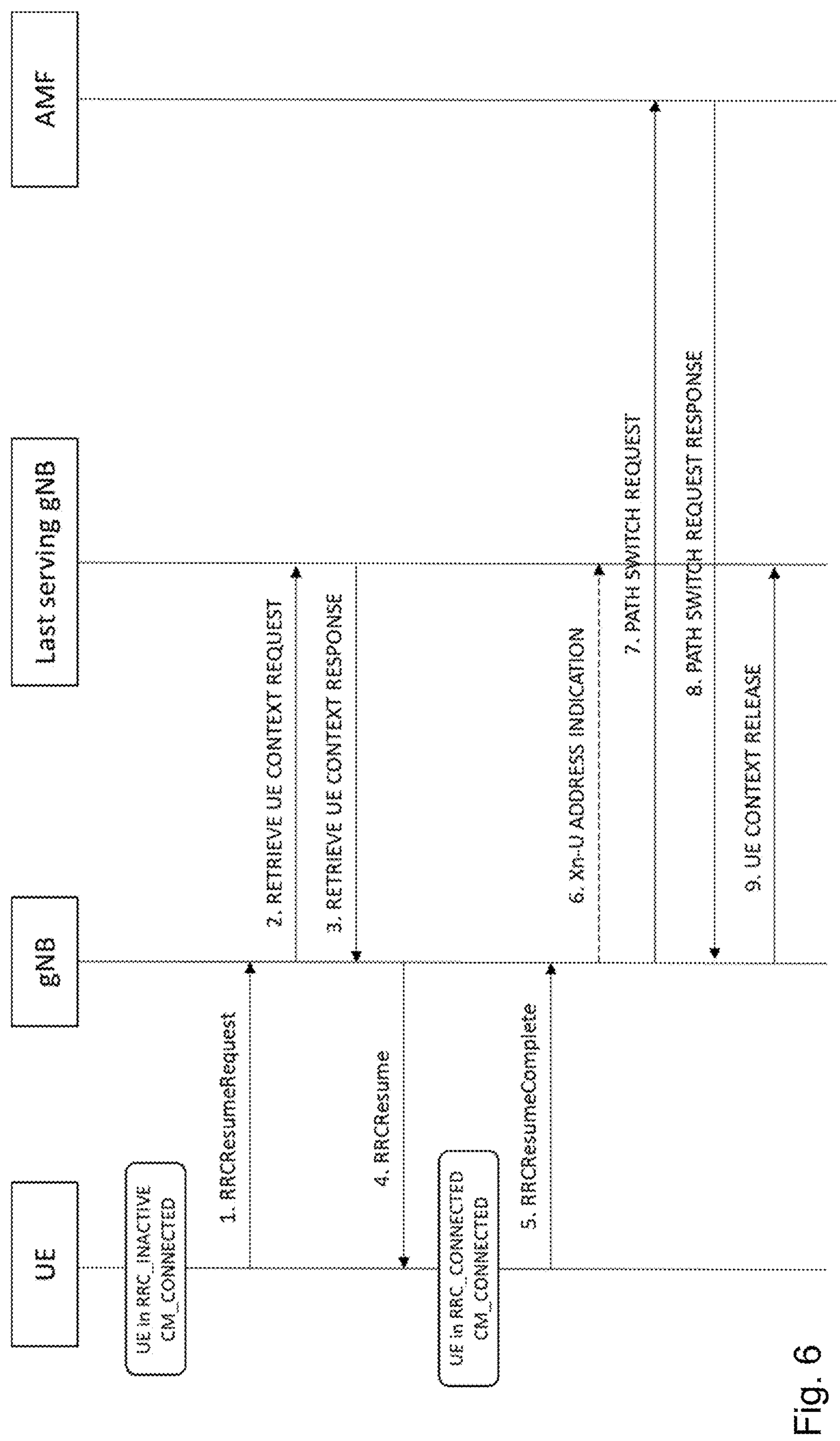
FIG. 6 describes the UE triggered transition from RRC_INACTIVE to RRC_CONNECTED for UE context retrieval success.

Based on the description above, certain challenges currently exist with multi-SIM user equipment (UEs). Certain aspects of the present disclosure and their embodiments may provide solutions to these or other challenges. For example, particular embodiments ensure that the UE in MU-SIM operation is synchronized with a first public land mobile network (PLMN) (e.g., PLMN-1) concerning the gaps the UE uses for performing actions in the second PLMN, during state transition procedures such as release (CONNECTED to IDLE), setup (IDLE to CONNECTED), suspend (CONNECTED to INACTIVE) and resume (INACTIVE to CONNECTED) in the first PLMN.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As used herein, the terms PLMN, system, and network are used inter-changeably to refer to an entity associated to a USIM at the UE. Also, MU-SIM, MUSIM or Multi-SIM are used inter-changeably.

Particular embodiments and examples are described with respect to UEs having MU-SIM operation, i.e., multiple USIMs for multiple PLMNs. However, the examples are applicable for any form of multi-entity connectivity where the UE is connected/registered to multiple entities, wherein these entities do not necessarily communicate directly. An "entity" can be a Mobile Network Operator (MNO), for example, and in that case the UE would be connected to multiple MNO's, which does not necessarily have to be associated to the UE having multiple SIM(s), in case other technology is used, e.g., in 6G.

As used herein, the term RRC_INACTIVE or Inactive state refers as the main example to the RRC_INACTIVE state as defined in TS 38.331. However, the term can also be interpreted as any sort of "dormant", "sleeping", or "power saving" state where operations are defined/optimized mainly for power savings (e.g., mobility based on cell reselection, or UE-based mechanism), UE monitors paging (e.g., paging channel and/or paging messages). It may be the case that in 6G (sixth generation of mobile communications), for example, a new dormant state is defined with a different name, and with at least some common characteristics of RRC_INACTIVE as defined in TS 38.331 for NR.

Particular embodiments and examples describe that the UE operates in MU-SIM with a first PLMN and a second PLMN. However, the method also comprises the case where the UE is in MU-SIM operation with more than two PLMNs and needs to perform state transitions with the first PLMN. The difference is that operations to be performed not related to the first PLMN are related to more than one additional PLMN, which depending on the UE capabilities and frequency bands of the additional PLMNs may require different gaps, e.g., longer than in the case of two PLMNs.

As used herein, the term RRC_CONNECTED (or simply CONNECTED) is used to indicate the RRC state, and CM CONNECTED (or 5GC_CONNNECTED) to indicate the state from the Core Network perspective, or simply use the term CONNECTED to refer to any of these terms. However, for the purpose of the embodiments described herein, these could be used inter-changeably to refer to a connected UE that is not performing Idle mode procedures (as specified in 38.304 or 36.304). A similar understanding is applicable for the terms RRC_IDLE and RRC_INACTIVE, which have their CN counterparts.

Particular embodiments address how to create/generate interruptions or "gaps" in the communication for a UE that is communicating in CM_CONNECTED/RRC_CONNECTED mode with PLMN1 using credentials from USIM1 during state transition scenarios such as from IDLE/INACTIVE to CONNECTED, and the UE behavior upon entering IDLE/INACTIVE concerning previously generated gaps. These gaps are then subsequently used by the UE to switch to another system (PLMN2) utilizing other credentials (USIM2) to, e.g., listen for pages. These gaps are, for example, informed to a target cell of a target gNodeB upon a transition from IDLE/INACTIVE to CONNECTED, e.g., by the UE and/or by the source gNodeB including gap information in the UE AS Inactive context (stored when the UE enters RRC_INACTIVE).

The term "gaps", "gap configuration", periodic pattern or pattern preferences may be interpreted as synonyms across the embodiments and examples, except when explicitly distinguished in a specific portion of the text. For example, when the UE reports a preference to the network, that may lead to a gap configuration from the network in response which may either be similar to what the UE has reported (e.g., in terms of the time domain slots that a gap will be created by the first PLMN for not scheduling information to the UE), or different (e.g., in case the first PLMN decides to be more or less generous).

The network can configure the UE to provide an indication during a transition from IDLE or INACTIVE to CONNECTED, such as UE assistance information on gaps that can be accounted by the network when the UE enters RRC_CONNECTED (or right after the UE has entered RRC_CONNECTED from RRC_IDLE or RRC_INACTIVE). It is expected that the information can be used for periodical/predictable operations that a multi-SIM UE should perform in another network.

During the state transition to RRC_CONNECTED (from IDLE/INACTIVE, or soon after, e.g., in the first RRCReconfiguration the UE receives after the transition), the network (e.g., the target network node during a transition to CONNECTED) can either "decline" the request from the UE to have these gaps (e.g., for operation with the PLMN2), "accept" or "accept and proposed modified version of the gaps". If a modified version of the gaps is received, the UE needs to adjust the operations with PLMN2 accordingly, e.g., if shorter periods are provided the UE can monitor fewer paging occasions in PLMN2 than what has been configured. The indication for decline, accept or accept with proposed modification can be indicated in one of the following message: i) RRCResume and/or ii) RRCRelease (in case of a two-step resume procedure where Resume request is responded with an RRC Release to IDLE or INACTIVE), or in iii) RRCReconfiguration (the first after transition to CONNECTED).

In particular embodiments the UE needs to monitor paging in a second PLMN (e.g., PLMN2), after it enters RRC_CONNECTED in the first PLMN, for example to allow the second PLMN to still be able to reach UEs in RRC_IDLE and in RRC_INACTIVE state through paging messages, and to notify UEs in RRC_IDLE, RRC_INACTIVE and RRC_CONNECTED state of system information change and ETWS/CMAS indications through short messages.

Some embodiments include indication(s) to the target gNodeB or stored by the UE and network during state transitions. Some embodiments rely on the UE storing or transmitting a periodic pattern that needs to be known at a first PLMN, so the UE can perform a set of IDLE/INACTIVE mode procedures in the second PLMN.

The pattern is either stored by the UE and network upon the UE entering IDLE or INACTIVE in the first PLMN or indicated by the UE to the target gNodeB upon transition to CONNECTED (e.g., during resume procedure or setup procedure). When the periodic pattern is not stored when the UE enters IDLE or INACTIVE, this is done either by the UE transmitting it during, or immediately after the resume or setup procedures.

Particular embodiments include the procedures during state transitions for any kind of periodic pattern and/or gap configuration that enables the multi-SIM operations. Below are examples of the information/pattern and how they may be calculated/generated by the UE. The pattern preference indication may also be used to indicate that the UE no longer prefers any pattern. The periodic pattern is based on at least the time properties of the following procedures in the second PLMN:

- Paging frame(s) and paging occasions configured for the UE;
- DRX cycle configuration;
- Periods the UE needs to perform serving cell measurements for S-criteria evaluation;
- Periods the UE needs to perform inter-frequency and inter-RAT measurements for cell detection;
- Periodic registration area updates;

In some embodiments, the periodic pattern represents a set of time domain windows (or "gaps") repeated periodically. In one option, the periodic pattern is defined based on time domain units associated to the frame structure of the first PLMN1, so that PLMN2 easily interprets how to act based on the report. To provide the "gaps", in some embodiments the UE may translate possible activities to be performed in, e.g., PLMN2 to "gaps" to be used in the network within PLMN1, referred to as "gap mapping". Some of the properties of the pattern may be window duration, window periodicity and offset for starting the first window in the pattern (having a time reference of the first or the second PLMN). An example of signaling is shown below:

```
PeriodicPattern ::=            SEQUENCE {
  periodicityAndOffset         CHOICE {
    sf5                        INTEGER (0..4),
    sf10                         INTEGER (0..9),
    sf20                         INTEGER (0..19),
    sf40                         INTEGER (0..39),
    sf80                         INTEGER (0..79),
    sf160                        INTEGER (0..159)
  },
  duration                     ENUMERATED { sf1, sf2, sf3,
sf4, sf5 }
}
```

| SSB-MTC field descriptions |
|---|
| duration<br>Duration of the window in which the UE wants to perform operations in the second PLMN (e.g. PLMN2) if the UE is operating in multi-SIM. It is given in number of subframes associated to the first PLMN (see TS 38.213, clause 4.1), i.e., the PLMN receiving the indication of the Periodic Pattern. |
| periodicityAndOffset<br>Periodicity and offset of the Periodic Pattern in which the UE wants to perform operations in the second PLMN (e.g. PLMN2) if the UE is operating in multi-SIM. Periodicity and offset are given in number of subframes. |

Upon reception of these during the transition to CONNECTED, in one embodiment, the network interprets the patterns and sets up gaps (e.g., measurement gaps in MeasConfig IE) in accordance with the received periodicityAndOffset parameter (providing Periodicity and Offset value for the following condition), by including the configuration in the RRCResume message, RRCSetup message (or any message including a configuration that indicates the UE to enter RRC_CONNECTED) or the first RRCReconfiguration after the transition to CONNECTED. The first subframe of each periodic pattern occasion occurs at an SFN and subframe of the NR SpCell meeting the following condition:

```
SFN mod T = (FLOOR (Offset/10));
if the Periodicity is larger than sf5:
  subframe = Offset mod 10;
else:
  subframe = Offset or (Offset +5);
with T = CEIL(Periodicity/10).
```

Some embodiments include other options for what is reported in terms of information (or stored by the UE, e.g., in the UE AS Inactive Context), such as at least one of the following:

- Preferred Connected mode DRX cycle configuration: Namely, connected mode DRX preferences can be reported to reflect periods where the UE may switch to another network.
- Preferred Measurement gap configuration: Namely, a minimum time the UE needs for the gaps and whether it needs it for only FR1, only FR2 or per UE gaps.
- Preferred radio frames to be silent, i.e., where the first PLMN should not schedule the UE.
- Preferred subframes to be silent, i.e., where the first PLMN should not schedule the UE Further examples on how the translation and signaling can be done are described in more detail below.

In some embodiments, the UE stores the gap pattern information in the UE AS Inactive context when the UE transitions to IDLE or INACTIVE in the first PLMN. However, while in the first PLMN in INACTIVE or IDLE (and assume the network has stored the periodic pattern and/or gap configuration or information derived from it), an event may occur/start in the second PLMN. Thus, despite having stored information in the UE AS Inactive Context of the first PLMN, the UE may anyways need to transmit some additional information (second indication) during the transition to CONNECTED, e.g., another type of indication (or information related to it), such as at least one of the following events in the first PLMN.

For example, the UE may need to transmit information about periodic events, e.g. inter-frequency cell reselection measurements. Once the event to start is triggered, that becomes a periodic event. Thus, the UE may send an update of the periodic pattern considering the durations the UE needs to perform the measurements, e.g., including additional occasions like in a delta signaling.

In one option, the second indication is of the same type of indication as the first indication, but containing only additional information (compared to the previously indicated periodic pattern), determined by the UE based on the need to perform inter-frequency measurements, and including in the updated pattern additional occasion for these measurements (or increasing the duration of the window).

In one option, the update of the pattern replaces the previous pattern. This means the new pattern can be of the same field/IE of the previous pattern.

In another option, the UE includes in the indication the event/cause value (or a list of events/causes), e.g., inter-frequency measurement in this case. This may enable the network to determine a new pattern, or to understand the reason why the UE needs the gaps.

The indication may be done in different ways. In one option that is only sent when the UE needs to transition to RRC_CONNECTED, e.g., in one of the options specified for transmitting that such as in the RRC Resume Request, in RRC Resume Complete or in the UE Assistance Information.

In another option, upon the occurrence of such an event, the UE triggers a request to the first PLMN so that the first PLMN has an opportunity to adjust its paging occasion(s) configuration accordingly for the UE that is to be in RRC_INACTIVE or RRC_IDLE in the first PLMN.

As another example, the UE may need to transmit information about more aperiodic events, i.e., events that do not lead to an additional periodic pattern. There are different ways to handle the aperiodic idle events regarding how to indicate something to the network. The usage may depend, e.g., how long the UE is expected to be absent.

In particular embodiments the UE indicates “Bye first PLMN, I will be away for X seconds.” In particular embodiments, the UE requests of the first PLMN “May I leave for X seconds?" and the UE waits for confirmation from first the PLMN. If the UE receives confirmation, it leaves; otherwise it does not.

In particular embodiments, the UE informs "I will be away (no time information)." When the UE is done, it informs to the first PLMN that it is back, e.g., over PUCCH, RACH, RRC, etc. In particular embodiments, the UE informs "I will be away (with time information)." When the UE is done, it returns without informing.

As another example, the UE may need to transmit information about one-time short events (i.e., not possible to know a periodicity associated, or aperiodic pattern), e.g., cell reselection and acquisition of system information in a newly selected cell. In this case, the UE may include in the second indication information such as the time off it needs to complete the procedure.

In one option, because the procedure is expected to be completed within a short time (10 ms or 100 s of ms), the UE does not expect a response from the first PLMN when it indicates that is leaving for a short time. In other words, the UE sends the message and directly switches to the second PLMN to perform the procedure.

In another example, the UE opportunistically continues and performs the actions in the second PLMN without indicating its absence to the first PLMN while the UE is in IDLE or INACTIVE in the first PLMN. For example, if cell reselection is being triggered because the UE was performing measurements, i.e., within the configured periodic pattern, the UE just continues the operations like SIBs acquisition. It might be the case that while the UE was performing these operations, outside the configured pattern, the network (first PLMN) tries to page the UE and fails, as the UE is not monitoring PDCCH on the first PLMN. Thus, one option is that upon returning from a procedure in the second PLMN performed outside the configured gaps/pattern (i.e., opportunistically), the UE transitions to CONNECTED and informs the first PLMN what has happened in case the first PLMN wants to perform root cause analyses, e.g., the UE indicates that it was performing system information acquisition in the second PLMN, or simply a one shot event. Or, alternatively, the UE indicates that and when it has finished the operation it indicates to the first PLMN, e.g., with a PUCCH, scheduling request, random access, an RRC message, etc. In another alternative, instead of triggering a transition to CONNECTED (e.g., initiate a resume procedure and transmit a resume request) the UE waits until another event triggers a transition to connected (e.g., NAS indication to trigger resume) and during/immediately after the resume procedure the UE indicates that to the first PLMN.

As another example, the UE may need to transmit information about more unpredictable one-time long event, e.g., entering connected state after paging reception. This is a one-time but relatively long event and quite unpredictable, i.e., not possible to know a periodicity associated, or aperiodic pattern.

In one option, the UE transmits the second indication and waits for a message (e.g., response) from the network, at least for some time, before it leaves/switches to the second PLMN to respond to paging by transitioning from IDLE to CONNECTED.

In one option, upon transmitting the second indication, the UE starts a timer. Upon receiving a response (e.g., indication to transition to IDLE state) the UE stops the timer. If the timer expires, the UE enters IDLE and indicate a failure to higher layers.

In one option, the second indication is an indication that the UE wants to enter a dormant state, e.g., like IDLE, in the first PLMN. Notice that on the second PLMN, this would lead to a bit longer time for the UE to respond to paging (so that it could be beneficial for the second PLMN to be aware this may happen, e.g., by knowing this is a multi-SIM UE).

As another example, the UE may need to transmit information about more predictable one-time long, e.g., mobility registration area update (RAU). This is a one-time but relatively long event, though different from paging, it can be a bit more predictable.

In one option, the UE transmits the second indication and waits for a message (e.g., response) from the network, at least for some time, before it leaves/switches to the second PLMN to conduct RAU by transitioning from Connected to Idle in the first PLMN and transitioning from IDLE to CONNECTED in the second PLMN.

In one option, upon transmitting the second indication, the UE starts a timer. Upon receiving a response (e.g., indication to transition to IDLE state) the UE stops the timer. If the timer expires, the UE enters IDLE and indicates a failure to higher layers.

In one option, the second indication is an indication that the UE wants to enter a dormant state, e.g., like IDLE, in the first PLMN. Notice that on the second PLMN, this would lead to a bit longer time for the UE to become reachable (so that it could be beneficial for the second PLMN to be aware this may happen, e.g., by knowing this is a multi-SIM UE, e.g., by having a more relaxed paging strategy configuration).

In general, as one option each procedure can be indicated to the first PLMN with the indication. It could be pre-determined that for a given procedure the UE does not expect to be transitioned by the first PLMN to RRC_IDLE, e.g., if a short time is needed for completing the procedure. Then, UE does not need to wait for a message in the first PLMN before actually continuing with the second PLMN.

If not pre-determined, the UE can wait for some time for a response from the first PLMN. That may be a message changing the DRX cycle in the first PLMN to a longer cycle (so the UE can complete its action in the second PLMN), e.g., a MAC CE indicating the usage of a long DRX cycle in the first PLMN. The UE starts a timer for waiting for the response. If the timer expires, the UE enters RRC_IDLE in the first PLMN, performs actions upon and leave to the first PLMN.

In one option each event may be indicated to the first PLMN so the first PLMN determines which action to take, e.g., change DRX cycle to long DRX, suspend the UE, release the UE, or keep the UE in connected but stop scheduling for some time.

An example of the first and/or second and/or third and/or fourth indications is shown in the following. For the first indication the UE should translate its activities to be performed in the network within PLMN2 to simple gaps to be provided for the network within PLMN1 (i.e. "gap mapping"). In this manner, the latter network does not need to understand deployment aspects related to the PLMN2 and may account just for interruptions within the connection of the UE.

An example of the configuration associated to the first and/or second and/or third and/or fourth indication is provided below for 38.331 (but can be similarly applicable to 36.331 as well).

The IE OtherConfig contains configuration related to miscellaneous other configurations.

OtherConfig Information Element

```
-- ASN1START
-- TAG-OTHERCONFIG-START
OtherConfig ::=                         SEQUENCE {
  delayBudgetReportingConfig            CHOICE{
    release                             NULL,
    setup                               SEQUENCE{
      delayBudgetReportingProhibitTimer               ENUMERATED {s0, s0dot4,
s0dot8, s1dot6, s3, s6, s12, s30}
    }
  }
OPTIONAL                              -- Need M
}
OtherConfig-v1540 ::=                   SEQUENCE {
  overheatingAssistanceConfig             SetupRelease
{OverheatingAssistanceConfig}                        OPTIONAL, -- Need
M
  ...
}
CandidateServingFreqListNR-r16 ::= SEQUENCE (SIZE (1..maxFreqIDC-r16)) OF
ARFCN-ValueNR
OtherConfig-v1610 ::=                       SEQUENCE {
  idc-AssistanceConfig-r16                      SetupRelease {IDC-
AssistanceConfig-r16}                           OPTIONAL, -- Need M
  drx-PreferenceConfig-r16                      SetupRelease {DRX-
PreferenceConfig-r16}                           OPTIONAL, -- Need M
############### omitted unchanged parts ################
}
DRX-PreferenceConfig-r16 ::=              SEQUENCE {
  drx-PreferenceProhibitTimer-r16             ENUMERATED {
                                                  s0, s0dot5, s1, s2, s3, s4,
s5, s6, s7,
                                                  s8, s9, s10, s20, s30,
spare2, spare1}
}
OtherConfig-v1700 ::=                       SEQUENCE {
  drx-PreferenceConfig-r17                      SetupRelease {DRX-
PreferenceConfig-r17}                           OPTIONAL, -- Need M
}
DRX-PreferenceConfig-r17 ::=              SEQUENCE {
  drx-PreferenceProhibitTimer-r16             ENUMERATED {
                                                  s0, s0dot5, s1, s2, s3, s4,
s5, s6, s7,
                                                  s8, s9, s10, s20, s30
spare2, spare1},
  reportingMode                           ENUMERATED {powerSaving, MUSIM, both}
}
-- TAG-OTHERCONFIG-STOP
-- ASN1STOP
```

| OtherConfig field descriptions |
|---|
| drx-PreferenceConfig<br>Configuration for the UE to report assistance information to inform the gNB about the UE's DRX preferences for power saving and/or MU-SIM operation. If drx-PreferenceConfig-r16 is configured, the UE is allowed to report DRX preferences for power saving. If drx-PreferenceConfig-r17 is configured, the UE report on DRX preferences may correspond to power saving, MU-SIM or both power saving and MU-SIM. The gNB cannot configure both drx-PreferenceConfig-r16 and drx-PreferenceConfig-r17. |
| drx-PreferenceProhibitTimer<br>Prohibit timer for DRX preferences assistance information reporting. Value in seconds. Value s0 means prohibit timer is set to 0 seconds, value s0dot5 means prohibit timer is set to 0.5 seconds, value s1 means prohibit timer is set to 1 second and so on. |
| idc-Assistance Config<br>Configuration for the UE to report assistance information to inform the gNB about UE detected IDC problem. |
| reportingMode<br>Indicates whether the UE report on DRX preferences should correspond to power saving purposes, MU-SIM purposes, or both power saving and MU-SIM. |

The UEAssistanceInformation message is used for the indication of UE assistance information to the network.

Signalling radio bearer: SRB1. SRB3

RLC-SAP: AM

Logical channel: DCCH

Direction: UE to Network

UEAssistanceInformation Message

```
-- ASN1START
-- TAG-UEASSISTANCEINFORMATION-START
UEAssistanceInformation ::=          SEQUENCE {
  criticalExtensions                   CHOICE {
    ueAssistanceInformation              UEAssistanceInformation-IEs,
    criticalExtensionsFuture             SEQUENCE { }
  }
}
[...]
UEAssistanceInformation-v1610-IEs ::= SEQUENCE {
  idc-Assistance-r16                   IDC-Assistance-r16        OPTIONAL,
  drx-Preference-r16                   DRX-Preference-r16        OPTIONAL,
[...]
  referenceTimeInfoPresence-r16        BOOLEAN                   OPTIONAL,
  nonCriticalExtension                 UEAssistanceInformation-v1700-IEs
OPTIONAL
}
[...]
UEAssistanceInformation-v1700-IEs ::= SEQUENCE {
  drx-Preference-r17                   DRX-Preference-r17        OPTIONAL,
  nonCriticalExtension                 SEQUENCE { }              OPTIONAL
}
-- TAG-UEASSISTANCEINFORMATION-STOP
-- ASN1STOP
```

| UEAssistance Information field descriptions |
|---|
| drx-Preference-r16, drx-Preference-r17<br>Indicates the UE-preferred DRX configurations. The field drx-Preference-r16 indicates the UE preferences for UE power saving purposes only. The field drx-Preference-r17 indicates the UE preferences for UE power saving purposes and/or MU-SIM connection purposes, according to DRX-PreferenceConfig-r17. |
| interferenceDirection<br>Indicates the direction of IDC interference. Value nr indicates that only NR is victim of IDC interference, value other indicates that only another radio is victim of IDC interference and value both indicates that both NR and another radio are victims of IDC interference. The other radio refers to either the ISM radio or GNSS (see TR 36.816). |
| messageSize<br>Indicates the maximum TB size based on the observed traffic pattern. The value refers to the index of TS 38.321, table 6.1.3.1-2. |
| minSchedulingOffsetPreference<br>Indicates the UE's preferences on minimumSchedulingOffset of cross-slot scheduling for power saving. |

| DRX-Preference field descriptions |
|---|
| preferredDRX-InactivityTimer<br>Indicates the UE's preferred DRX inactivity timer length. Value in ms (millisecond). ms0 corresponds to 0, ms1 corresponds to 1 ms, ms2 corresponds to 2 ms, and so on. If the field is absent from the DRX-Preference IE, it is interpreted as the UE having no preference for the DRX inactivity timer. |
| preferredDRX-LongCycle<br>Indicates the UE's preferred long DRX cycle length. Value in ms. ms10 corresponds to 10 ms, ms20 corresponds to 20 ms, ms32 corresponds to 32 ms, and so on. If preferredDRX-ShortCycle is provided, the value of preferredDRX-LongCycle shall be a multiple of the preferredDRX-ShortCycle value. If the field is absent from the DRX-Preference IE, it is interpreted as the UE having no preference for the long DRX cycle. |
| preferredDRX-ShortCycle |

-continued

| DRX-Preference field descriptions |
|---|
| Indicates the UE's preferred short DRX cycle length. Value in ms. ms2 corresponds to 2 ms, ms3 corresponds to 3 ms, ms4 corresponds to 4 ms, and so on. If the field is absent from the DRX-Preference IE, it is interpreted as the UE having no preference for the short DRX cycle. |
| preferredDRX-ShortCycleTimer |
| Indicates the UE's preferred short DRX cycle timer. Value in multiples of preferredDRX-ShortCycle. A value of 1 corresponds to preferredDRX-ShortCycle, a value of 2 corresponds to 2 * preferredDRX-ShortCycle and so on. If the field is absent from the DRX-Preference IE, it is interpreted as the UE having no preference for the short DRX cycle timer. A preference for the short DRX cycle is indicated when a preference for the short DRX cycle timer is indicated. |

The ORAN forum describes an open RAN architecture. ORAN includes further decomposition of the gNodeB into functional entities and interfaces in between. An example is illustrated in FIG. 7.

Figure 7:
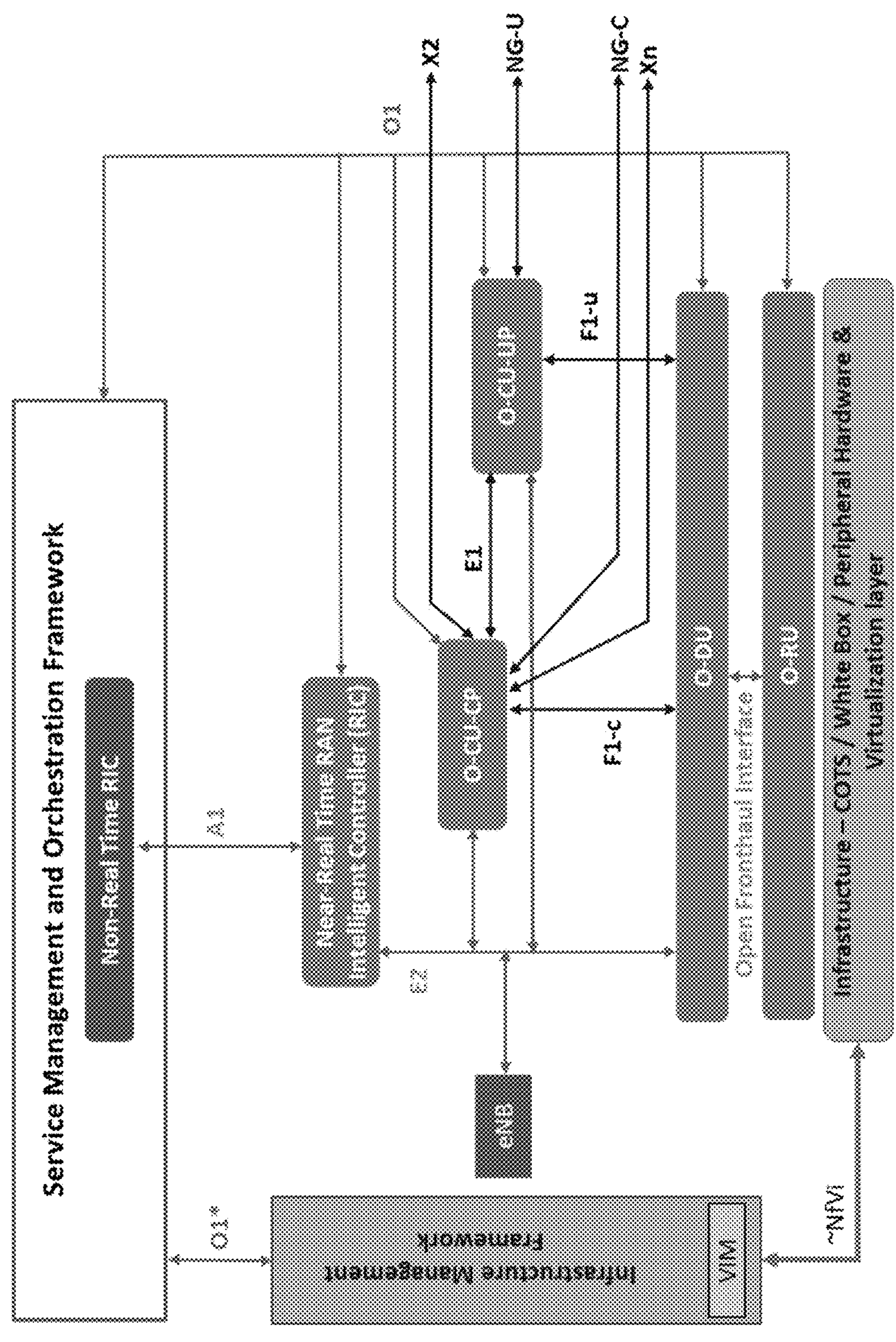
FIG. 7 is a block diagram illustrating an example ORAN architecture.

FIG. 7 is a block diagram illustrating an example ORAN architecture. In context of particular embodiments, the information referred to as 'pattern preference' and 'gap configuration' can be stored in any of the following: Non-real Time RIC, Near-Real Time RIC, O-CU-CP and consequently be transferred on A1, E2 and FIC interface.

A first group of embodiments includes UE-based solutions. Some embodiments include an indication upon transition to CONNECTED. Particular embodiments comprise a set of actions performed by a wireless terminal (also called a User Equipment—UE). The method comprises the following steps.

If the UE is in transition from RRC_INACTIVE/RRC_IDLE to RRC_CONNECTED in a first PLMN (associated with the first USIM) to a first cell associated to a first gNodeB and the UE is at the same time in IDLE/INACTIVE in a second PLMN (associated with the second USIM), the UE determines a pattern preference for performing a set of IDLE/INACTIVE mode procedures in the second PLMN.

The UE transmits an indication with information on the pattern preference to the first PLMN during or after (i.e., first or second message transmitted after it has entered CONNECTED) the transition from RRC_INACTIVE/RRC_IDLE to RRC_CONNECTED), wherein the indication is transmitted to the a first cell associated to a first gNodeB where the UE performs a transition to RRC_CONNECTED.

In one option, the indication is included in or with a request to resume the connection (e.g., the RRCResumeRequest or RRCResumeRequest1 message), or the indication is included in a request to setup the connection (e.g., when the UE is coming from RRC_IDLE, the RRCSetupRequest message). In that case, one option is that the UE includes another indication encoded as a physical random access channel (PRACH) resource (e.g., a PRACH preamble and/or a PRACH time and/or frequency resource) indicating that the UE has available information regarding the pattern preference. Upon receiving that, the network can transmit a request to the UE (e.g., in the random access response (RAR) and/or in a MAC control element with the RAR) so that upon receiving the request, the UE includes the information on pattern preference in the RRCResumeRequest or in the RRCResumeRequest1 message.

In one sub-option, the indication is part of the RRC request message payload (e.g., in RRCResumeRequest, RRCResumeRequest1, RRCSetupRequest), as a field, parameter and/or information element in the message. In one sub-option, the indication is transmitted multiplexed with the RRC request message (e.g., in RRCResumeRequest, RRCResumeRequest1, RRCSetupRequest), e.g., in another message that is multiplexed with the RRC requested message, such as in the same lower layer protocol PDU (e.g. in the same MAC PDU).

In one option, the indication is included in a message to complete the resume of the connection (e.g., the RRCResumeComplete message), or the indication is included in a message to complete the setup of the connection (e.g., when the UE is coming from RRC_IDLE, the RRCSetupComplete message). In that case, one option where the UE is coming from RRC_INACTIVE is that the UE includes another indication in the Resume Request message, e.g., RRCResumeRequest or RRCResumeRequest1, (or in a message multiplexed with the Resume Request message), indicating that the UE has available information regarding the pattern preference; in one option, the network (possibly upon receiving that indication in resume request) may transmit a request to the UE (e.g., in RRC Resume message) so that upon receiving the request, the UE includes the information on pattern preference in the RRCResumeComplete message. In that case, in another option where the UE is coming from RRC_IDLE is that the UE includes another indication in the Setup Request message, e.g., RRCSetupRequest, (or in a message multiplexed with the Setup Request message), indicating that the UE has available information regarding the pattern preference; upon receiving that the network can transmit a request to the UE (e.g., in RRC Setup message) so that upon receiving that request the UE includes the information on pattern preference in the RRCSetupComplete message.

In one sub-option that is included in the Complete message (e.g., RRCResumeComplete) by the UE upon request from the network in RRCResume. In other words, the UE transmits an RRC Resume Request and receives an RRC Resume in response, including a request for the indication, wherein the indication is a field and/or parameter in the RRC Resume message. In one sub-option that is included in the Complete message (e.g., RRCSetupComplete) by the UE upon request from the network in RRCSetup. In other words, the UE transmits an RRC Setup Request (or an RRC Resume Request, in case of fallback) and receives an RRC Setup in response, including a request for the indication, wherein the indication is a field and/or parameter in the RRC Resume message.

In one option the indication is included in a message transmitted after the UE enters RRC_CONNECTED, e.g., upon a request from the network, such as in a UE Information Request message or if the UE is configured to provide UE Assistance Information related to MUSIM. In that case, one option where the UE is coming from RRC_INACTIVE is that the UE includes another indication in the Resume Complete message, e.g., RRCResumeComplete, (or in a message multiplexed with the RRCResumeComplete message), indicating that the UE has available information regarding the pattern preference. Upon receiving that the network can transmit a request to the UE (e.g., in an RRC Information Request) so that upon receiving that request the UE includes the information on pattern preference in the UE Information Response message. In that case, in another option where the UE is coming from RRC_IDLE, during connection setup that the UE includes another indication in the Setup Complete message, e.g., RRCSetupComplete, (or in a message multiplexed with the RRCSetupComplete message), indicating that the UE has available information regarding the pattern preference. Upon receiving that the network can transmit a request to the UE (e.g., in an RRC Information Request) so that upon receiving that request the UE includes the information on pattern preference in the UE Information Response message. In that case, in another option where the UE is coming from either RRC_INACTIVE or RRC_IDLE, if configured in RRC_CONNECTED to provide UE Assistance Information related to MUSIM, the UE includes the information on pattern preference in the UE Assistance Information message.

In one option, the indication is included in an encrypted message which requires the UE to refresh security keys (e.g., encryption keys) upon transmitting the indication or before that, i.e., by deriving a KgNB key based on the current KgNB key or NH, using the stored next hop chaining count value, and deriving the encryption key, e.g., KRRCenc key, and configuring lower layers to apply encryption, e.g., for SRB1 using the configured algorithm and the KRRCenc key. This may apply to any of the cases above. That guarantees that no other malicious user/UE is listening to what the UE is indicating in terms of pattern preference to the first PLMN. That requires the UE to refresh security keys before transmitting the pattern preference to the network.

In one option, the indication is included in an integrity protected message which requires the UE to refresh security keys (e.g., integrity keys) upon transmitting the indication or before that, i.e., by deriving a KgNB key based on the current KgNB key or NH, using the stored next hop chaining count value, and deriving the integrity key, e.g., KRRCint key, and configuring lower layers to apply integrity protection, e.g., for SRB1 using the configured algorithm and the KRRCint key. That guarantees that the network, upon receiving the message, makes sure this is a legitimate UE. In one option, the indication is included with a security token, e.g., a short MAC, a resume MAC-I or a security token calculated from a set of parameters known by the legitimate UE (such as stored C-RNTI, last serving cell identifier(s)).

In some embodiments, the method comprises the UE receiving a "gap configuration" from the first PLMN during/or after (i.e., first or second message transmitted after it has entered CONNECTED) the transition from RRC_INACTIVE/RRC_IDLE to RRC_CONNECTED, wherein the "gap configuration" is generated by the first PLMN based on the pattern preference.

In one option, the gap configuration is transmitted in an RRCResume message; or an RRCSetup message; or in an RRCReconfiguration message. In one option, the gap configuration is a delta signaling for an existing gap configuration the UE may be configured with.

In one option, the absence of the gap configuration (e.g., in RRC Setup or RRCResume) is an indication that previous gap is to be used by the UE, i.e., the UE is not required to perform PDCCH monitoring in the first PLMN according to the UE's current gap configuration (stored at the UE). In one option, the absence of the gap configuration (e.g., in RRC Setup or RRCResume) is an indication that previous gap is to be released (so the UE releases the gap configuration).

In one option, the configuration indicates that previous gap needs to be released.

In another embodiment, the "gap configuration" is an indication that the pattern preference is accepted by the first PLMN, i.e., the UE is not required to monitor PDCCH on the first PLMN during the time periods defined by the pattern preference. In another embodiment, the "gap configuration" is an indication that the pattern preference is rejected by the first PLMN, i.e., the UE is not required to skip monitoring PDCCH on the first PLMN during the time periods defined by the pattern preference.

In another embodiment, the "gap configuration" is included in a measurement configuration. In one option, it is transparent to the UE whether the gap is configured for inter-frequency measurements configured by the first PLMN, or for operation in the second PLMN, or both. In one option, the UE is aware that the gap is configured for inter-frequency measurements configured by the first PLMN, or for operation in the second PLMN, or both. There may be a specific field for configuring gap for operations with a second PLMN.

In another embodiment, the "gap configuration" is used for performing actions in the second PLMN, and also for performing inter-frequency measurements configured by the first PLMN. For example, the first PLMN configures the gap by considering the inter-frequency/inter-RAT measurements the UE should perform and the reported pattern for operations with the second PLMN.

In particular embodiments, the method comprises the UE releasing/deleting/not storing the "gap configuration" associated with the first PLMN upon entering RRC_INACTIVE or RRC_IDLE in the first PLMN.

In one option, the "gap configuration" corresponds to the pattern preference. In one option, the action of releasing "gap configuration" is indicated in the RRC Release message, and only upon reception of it the UE releases the "gap configuration". In one option, the action of releasing "gap configuration" is indicated in the RRCReconfiguration message before the UE receives a Release message, upon which the UE releases the "gap configuration". In one option, the action of releasing "gap configuration" is only performed if the UE enters RRC_IDLE, i.e., upon entering RRC_INACTIVE (reception of RRC Release including suspend configuration) the UE stores the "gap configuration".

A second group of embodiments include RAN-based solutions. Some embodiments include a set of actions performed by a first network node in a first PLMN (also called a gNodeB—gNB, and operating as last serving gNB for a UE that is suspended or released). The method comprises the following steps.

The network node may receive the pattern preference from the UE (e.g., according to one of the methods described above, such as in a UE assistance information and/or in RRC Resume Complete) and/or determining a gap configuration based on the pattern preference received from the UE. That can be received upon a state transition, e.g., to RRC_CONNECTED, according to one of the embodiments described above, or while the UE is already in RRC_CONNECTED, e.g., like after the state transition or during a handover/PCell change/reconfiguration with sync.

The network node may store the pattern preference from the UE. The storing action may be performed upon transitioning the UE to RRC_INACTIVE, i.e., upon transmitting an RRCRelease message including a suspend configuration to the UE. In that case the pattern preference is stored in the UE Inactive AS Context. The storing action may be performed upon transitioning the UE to RRC_IDLE, i.e., upon transmitting an RRCRelease message not including a suspend configuration to the UE. In that case the pattern preference is stored in a Core Network node. Thus, upon entering RRC_IDLE the first network node, i.e., the last serving gNB (or the last gNB holding the UE Idle AS Context), transmits to a CN node (e.g., MME and/or AMF) the pattern preference, so that it may be retrieved by a gNB (which may be the same as the last serving gNB) after the UE transitions to RRC_CONNECTED.

Some embodiments include a set of actions performed by a second network node in a first PLMN (also called a gNodeB—gNB, and operating as target gNB for a UE that is transitioning to RRC_CONNECTED). the method comprises the following steps.

The network node may receive a request from the UE to resume a connection, e.g., RRCResumeRequest or RRCResumeRequest1 message, determine the gNodeB where the UE AS Inactive Context is stored (last serving gNB) and send a request to that gNodeB for retrieving the UE context (UE AS Inactive context).

The network node may receive the pattern preference by new serving gNodeB from the old serving gNodeB in the Retrieve UE Context Response message.

The network node may determine whether to apply the same gap configuration according to the pattern preference or whether it will modify. If it determines to modify, including in an RRCResume message the modified gap pattern (and/or a delta signaling modifying what the UE has stored as a pattern preference).

A third group of embodiments include CN-based solutions. Some embodiments include a set of actions performed by a first core network node in a first PLMN (also called a AMF). the method comprises the following step.

The AMF receives the pattern preference (or gaps configuration) from the last serving gNB (or the last gNB holding the UE Idle AS Context), e.g. in the Path Switch Request message or in the RRC Inactive Transition Report or in UE Context Release Request and stores it in the UE MM Context or UE Context.

The AMF provides the pattern preference (or gaps configuration) to the serving gNB, e.g., in the Path Switch Request Acknowledge message or in the Initial UE Context Setup Request message or in Downlink NAS Transport message.

As an alternative, in particular to the case the UE enters RRC_IDLE, where the UE in NR and the NG-RAN (i.e., last serving gNodeB) would not store a UE context. Hence, by storing it at the CN, the UE can transition back to CONNECTED and, the NG-RAN can retrieve what gaps the UE requires for operating with the second PLMN.

The following are signaling flow examples between UE, RAN and CN. The embodiments above are exemplified below focusing on the standard related actions.

Some embodiments include additions to the Resume procedure. An example is illustrated in FIG. 8.

Figure 8:
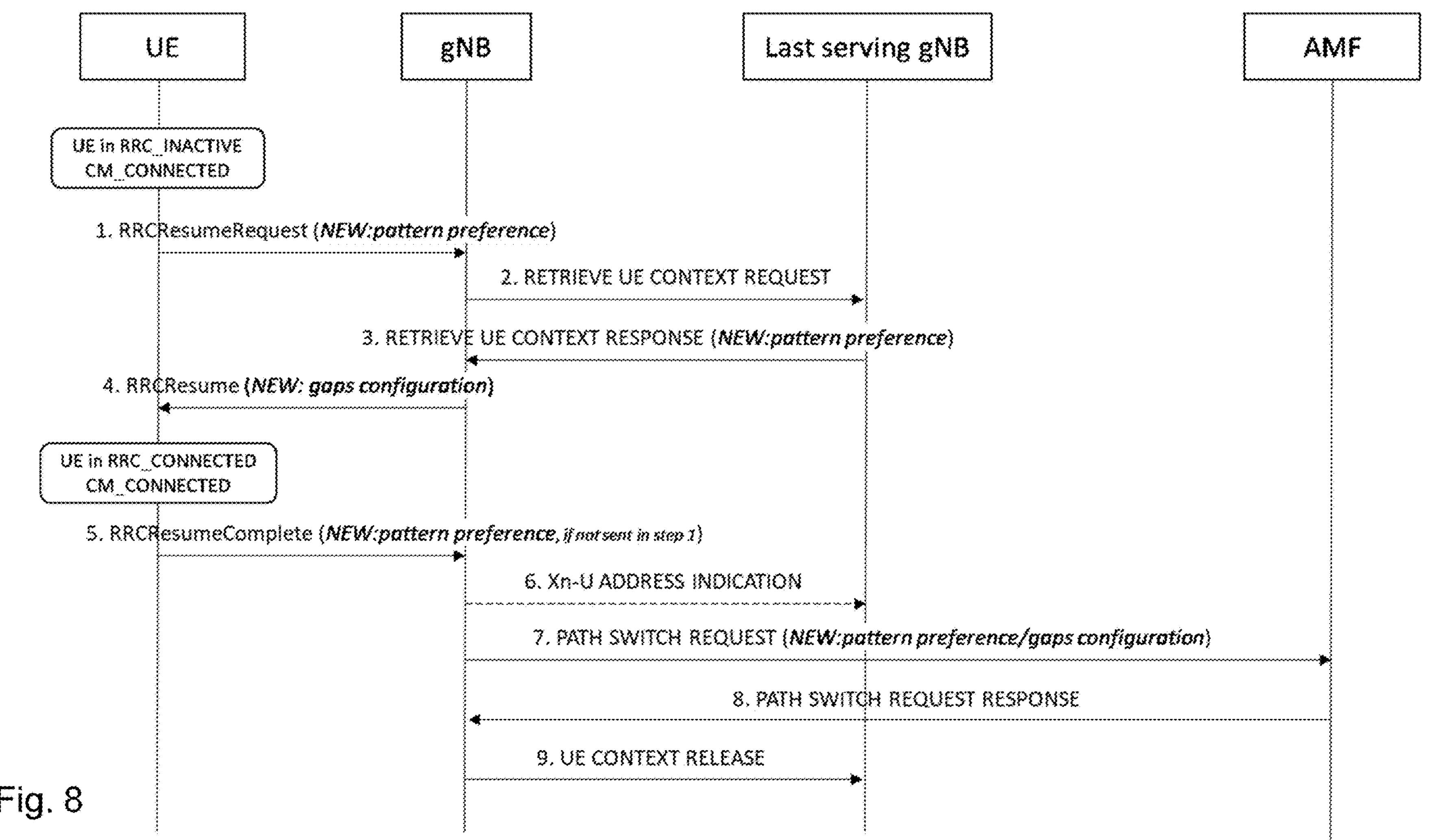
FIG. 8 is a sequence diagram illustrating UE triggered transition from RRC_INACTIVE to RRC_CONNECTED (UE context retrieval success)

FIG. 8 is a sequence diagram illustrating UE triggered transition from RRC_INACTIVE to RRC_CONNECTED (UE context retrieval success). At step 1 the UE resumes from RRC_INACTIVE, providing the I-RNTI, allocated by the last serving gNB. The UE provides indication on pattern preference.

At step 2 the gNB, if able to resolve the gNB identity contained in the I-RNTI, requests the last serving gNB to provide UE Context data.

At step 3 the last serving gNB provides UE context data. The UE Inactive Context data contains information on pattern preference.

At steps 4 and 5, the gNB and UE completes the resumption of the RRC connection. RRCResume can contain gaps for performing idle/inactive procedures in the second PLMN. If pattern preference cannot be included in step 1, it can be provided by UE in step 5. User Data can also be sent in step 5 if the grant allows.

At step 6, if loss of DL user data buffered in the last serving gNB shall be prevented, the gNB provides forwarding addresses.

At steps 7 and 8, the gNB performs path switch. AMF receives pattern preference and stores it in the UE MM Context.

At step 9, the gNB triggers the release of the UE resources at the last serving gNB. At step 10, if pattern preference was provided by the UE in step 5, the gNodeB can provide the UE with gaps for performing idle/inactive procedures in the second PLMN subsequent to step 5.

Some embodiments include additions to the NAS fallback procedure. An example is illustrated in FIG. 9.

Figure 9:
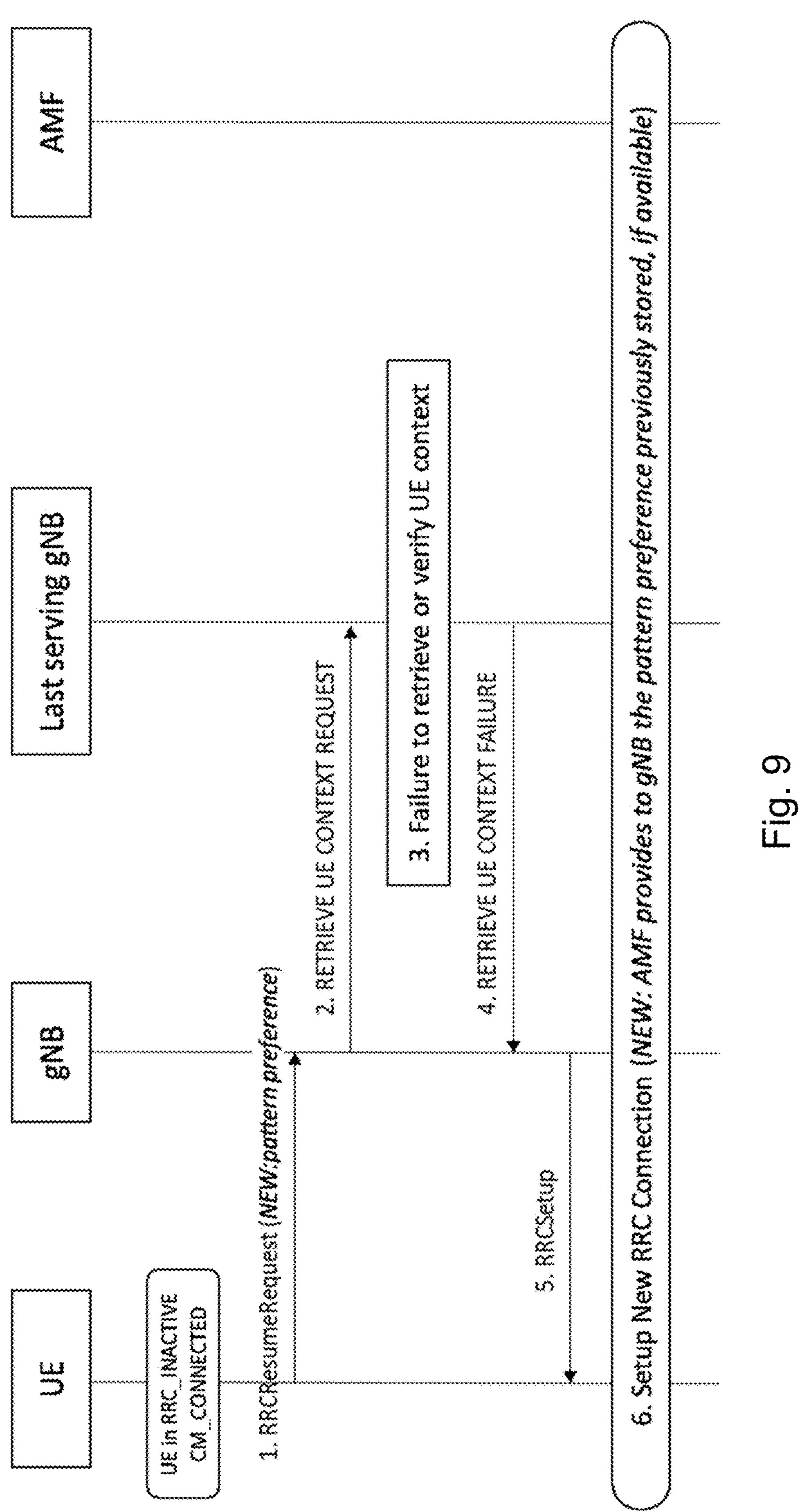
FIG. 9 is a sequence diagram illustrating UE triggered transition from RRC_INACTIVE to RRC_CONNECTED (UE context retrieval failure)

FIG. 9 is a sequence diagram illustrating UE triggered transition from RRC_INACTIVE to RRC_CONNECTED (UE context retrieval failure). At step 1, the UE resumes from RRC_INACTIVE, providing the I-RNTI, allocated by the last serving gNB.

At step 2, the gNB, if able to resolve the gNB identity contained in the I-RNTI, requests the last serving gNB to provide UE Context data.

At step 3, the last serving gNB cannot retrieve or verify the UE context data. At step 4, the last serving gNB indicates the failure to the gNB.

At step 5, the gNB performs a fallback to establish a new RRC connection by sending RRCSetup.

At step 6, a new connection is setup as described in clause 9.2.1.3.1. During connection setup, AMF provides to gNodeB the pattern preference stored in AMF in step 7.

Figure 10:
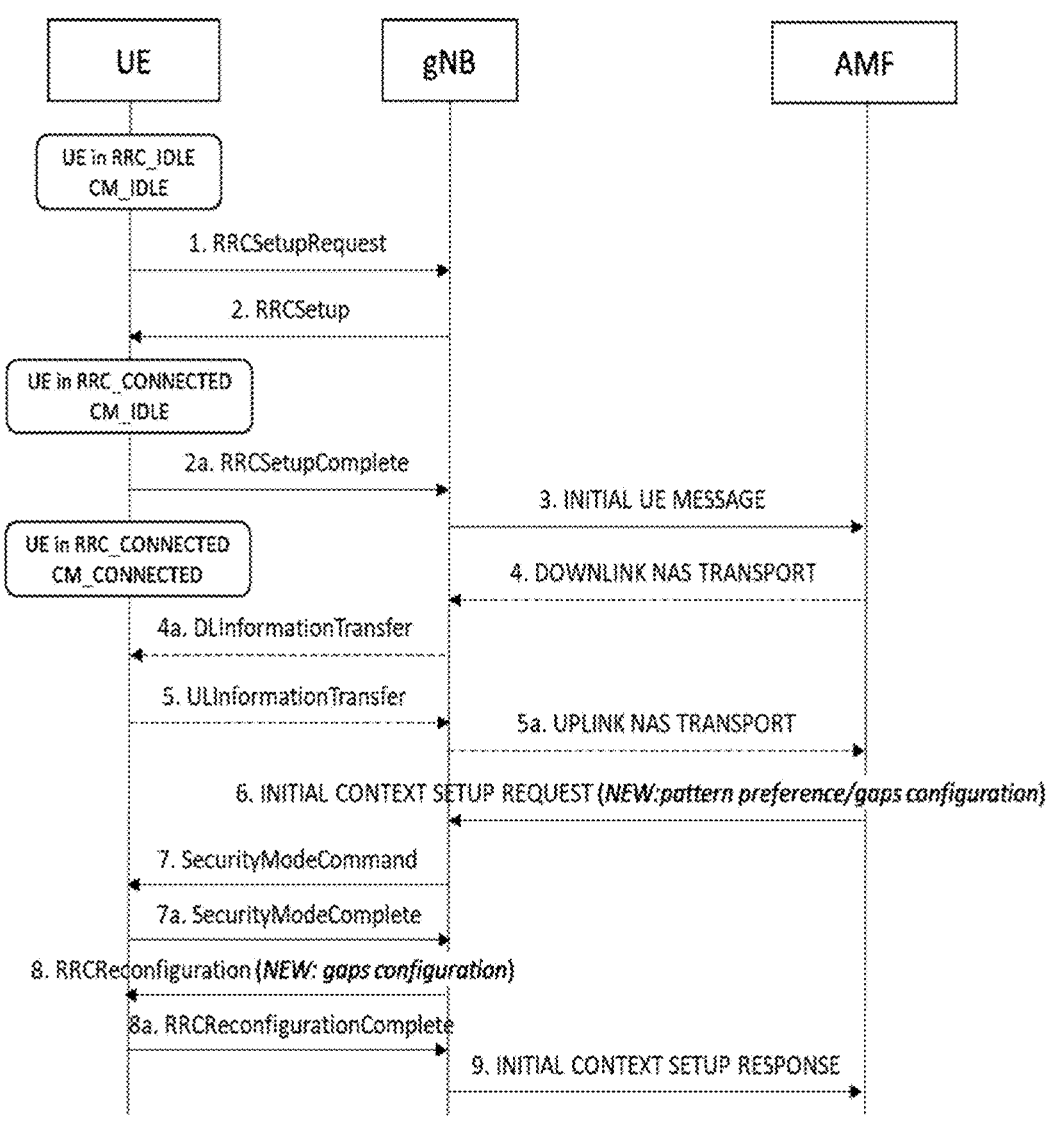
FIG. 10 is a sequence diagram illustrating the UE triggered transition from RRC_IDLE to RRC_CONNECTED (for the NAS part)

FIG. 10 is a sequence diagram illustrating the UE triggered transition from RRC_IDLE to RRC_CONNECTED (for the NAS part, see TS 23.502). At step 1, the UE requests to setup a new connection from RRC_IDLE. At step 2/2a. the gNB completes the RRC setup procedure.

The scenario where the gNB rejects the request is described below.

At step 3, the first NAS message from the UE, piggybacked in RRCSetupComplete, is sent to AMF.

At steps 4/4a/5/5a, additional NAS messages may be exchanged between UE and AMF. see TS 23.502. If available, the AMF provides the pattern preference.

At step 6, the AMF prepares the UE context data (including PDU session context, the Security Key, UE Radio Capability and UE Security Capabilities, etc.) and sends it to the gNB. If available, the AMF provides the pattern preference.

At steps 7/7a, the gNB activates the AS security with the UE.

At steps 8/8a, the gNB performs the reconfiguration to setup SRB2 and DRBs.

At step 9, the gNB informs the AMF that the setup procedure is completed.

RRC messages in step 1 and 2 use SRB0, all the subsequent messages use SRB1. Messages in steps 7/7a are integrity protected. From step 8 on, all the messages are integrity protected and ciphered. For signaling only connection, step 8 is skipped because SRB2 and DRBs are not setup.

Figure 11:
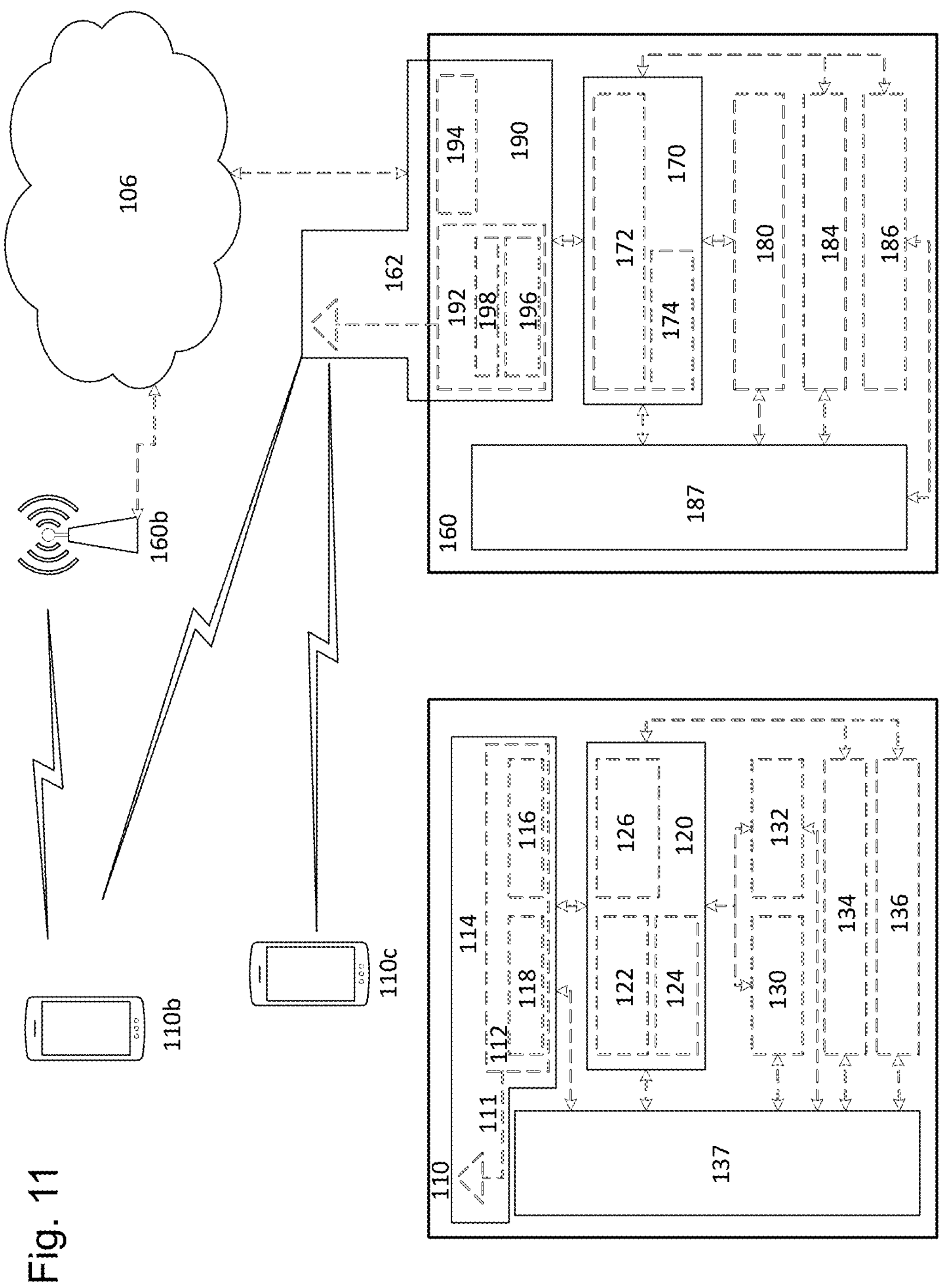
FIG. 11 is a block diagram illustrating an example wireless network.

FIG. 11 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 160 includes processing circuitry 170, device readable medium 180, interface 190, auxiliary equipment 184, power source 186, power circuitry 187, and antenna 162. Although network node 160 illustrated in the example wireless network of FIG. 11 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 11 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IOT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IOT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 12:
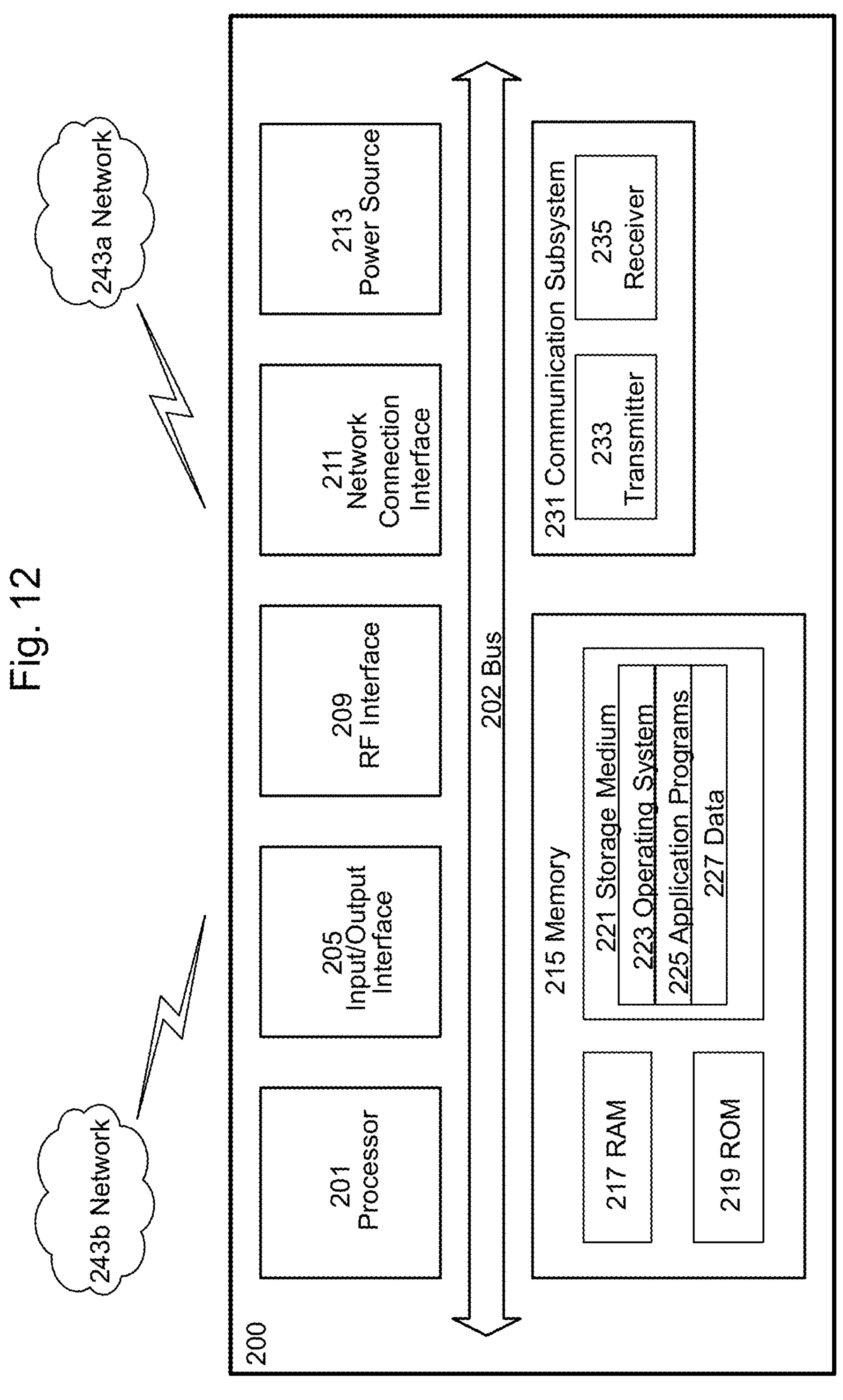
FIG. 12 illustrates an example user equipment, according to certain embodiments.

FIG. 12 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IOT UE, a machine type communication (MTC) UE, and/or an enhanced MTC (eMTC) UE. UE 200, as illustrated in FIG. 12, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12. RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 12, processing circuitry 201 may be configured to communicate with network **243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235** of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network **243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200**.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

FIG. 13 is a flowchart illustrating an example method in a wireless device, according to certain embodiments. In particular embodiments, one or more steps of FIG. 13 may be performed by wireless device 110 described with respect to FIG. 11. The wireless device (e.g., a multi-SIM wireless device) is operating in both a first network and a second network (e.g., is in an idle/inactive state in the second network).

The method may begin at step 1312, where the wireless device (e.g., wireless device 110) determines a pattern for performing procedures (e.g., a set of idle/inactive mode procedures) in the second network. In particular embodiments, the determined pattern is based on one or more of the following procedures in the second network: paging frames and paging occasions configured for the wireless device, discontinuous reception (DRX) cycle, periods for performing measurements, and periodic registration area updates. The determined pattern may comprise a set of time domain windows. The determined pattern may comprise any of the patterns described with respect to any of embodiments and examples described above.

At step 1314, in some embodiments the wireless device may transmit an indication to the first network that the wireless device has determined the pattern for performing the procedures in the second network. In response, at step 1316, the wireless device may receive a request from the first network for the determined pattern. Steps 1314 and 1316 let the network decide whether it would like to receive the determined pattern.

Other embodiments skip directly to step 1318. Upon transition of the wireless device from an inactive/idle state to a connected state in the first network, at step 1318 the wireless device transmits an indication of the determined pattern to the first network. In particular embodiments, transmitting the indication of the determined pattern comprises transmitting a radio resource control (RRC) message. The RRC message may comprise one of a RRC resume request, RRC setup request, RRC resume complete, RRC setup complete, and RRC UE assistance information message. In some embodiments, transmitting the indication is performed immediately upon transition and in some embodiments transmitting the indication is performed some time after the transition.

In some embodiments, the method may stop at step 1318. The wireless device may assume that the network will use the determined pattern to avoid scheduling the wireless device at inopportune times. In some embodiments the method may continue to step 1320.

At step 1320, the wireless device may receive a gap configuration from the first network node. The gap configuration is based on the pattern. Receiving the gap configuration may comprise receiving one of a RRC resume, RRC setup, and RRC reconfiguration message. The gap configuration may comprise any of the gap configurations described with respect to the embodiments and examples described above. The wireless device may use the gap configuration to determine when the network will not schedule the wireless device and the wireless device is free to perform other operations.

At step 1322, upon transition of the wireless device to an idle/inactive state in the first network, the wireless device releases the gap configuration. In some embodiments, releasing the gap configuration is performed immediately upon transition and in some embodiments releasing the gap configuration is performed some time after the transition. For example, the wireless device may release the gap configuration when resuming from the inactive state.

Modifications, additions, or omissions may be made to method 1300 of FIG. 13. Additionally, one or more steps in the method of FIG. 13 may be performed in parallel or in any suitable order.

Figure 14:
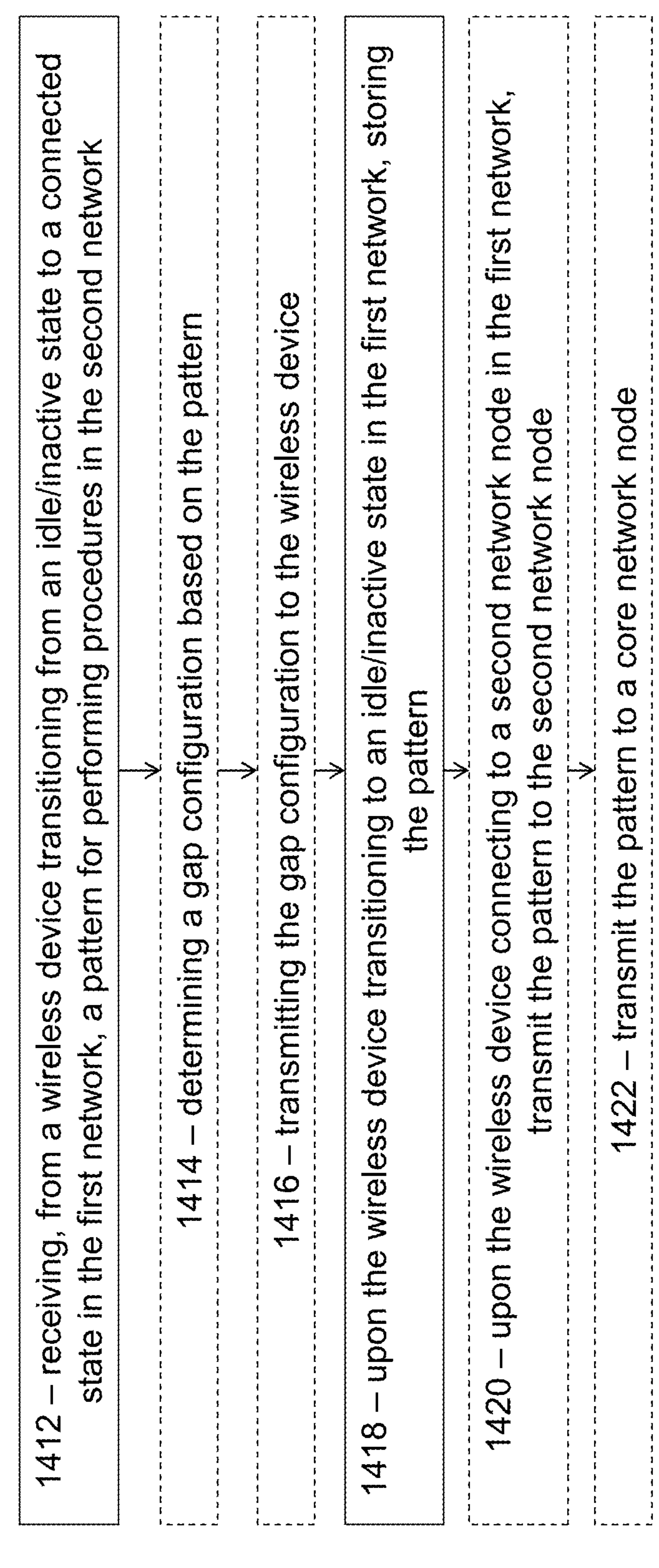
FIG. 14 is flowchart illustrating an example method in a network node, according to certain embodiments.

FIG. 14 is a flowchart illustrating an example method in a network node, according to certain embodiments. In particular embodiments, one or more steps of FIG. 14 may be performed by network node 160 described with respect to FIG. 11. The network node a first network node in a first network serving a first wireless device (e.g., Multi-SIM wireless device). The wireless device is also operating in a second network (e.g., in an idle/inactive state).

The method begins at step 1412, where a network node (e.g., network node 160) receives, from the wireless device transitioning from an idle/inactive state to a connected state in the first network, a pattern for performing procedures (e.g., a set of idle/inactive mode procedures) in the second network. In particular embodiments, receiving the pattern comprises receiving one of a RRC resume request, RRC setup request, RRC resume complete, RRC setup complete, and RRC UE assistance information message. In particular embodiments, the pattern is based on one or more of the following procedures in the second network: paging frames and paging occasions configured for the wireless device, DRX cycle, periods for performing measurements, and periodic registration area updates.

In particular embodiments, receiving the pattern comprises receiving one of a RRC resume request, RRC setup request, RRC resume complete, and RRC setup complete message.

The determined pattern may comprise any of the patterns described with respect to any of embodiments and examples described above.

At step 1414, the network node may determine a gap configuration based on the pattern, and at step 1416, the network node transmits the gap configuration to the wireless device. Transmitting the gap configuration may comprise transmitting one of a RRC resume, RRC setup, and RRC reconfiguration message. The gap configuration may comprise any of the gap configurations described with respect to the embodiments and examples described above.

At step 1418, upon the wireless device transitioning to an idle/inactive state in the first network, the network node stores the pattern. In particular embodiments, storing the pattern comprises storing the pattern in an access stratum (AS) context for the wireless device.

In some embodiments, the network node may share the pattern with another network node (e.g., during or after a mobility procedure).

At step 1420, the network node may, upon the wireless device connecting to a second network node in the first network, transmit the pattern to the second network node. Transmitting the pattern to the second network node may comprise transmitting a retrieve context response message.

At step 1422, the network node may transmit the pattern to a core network node. Transmitting the pattern to the core network node may comprise transmitting one of a path switch request. RRC inactive transition report and a context release request.

Modifications, additions, or omissions may be made to method 1400 of FIG. 14. Additionally, one or more steps in the method of FIG. 14 may be performed in parallel or in any suitable order.

FIG. 15 illustrates a schematic block diagram of two apparatuses in a wireless network (for example, the wireless network illustrated in FIG. 11). The apparatuses include a wireless device and a network node (e.g., wireless device 110 and network node 160 illustrated in FIG. 11). Apparatuses 1600 and 1700 are operable to carry out the example methods described with reference to FIGS. 13 and 14, respectively, and possibly any other processes or methods disclosed herein. It is also to be understood that the methods of FIGS. 13 and 14 are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, transmitting module 1606, and any other suitable units of apparatus 1600 to perform corresponding functions according one or more embodiments of the present disclosure. Similarly, the processing circuitry described above may be used to cause receiving module 1702, determining module 1704, transmitting module 1706, and any other suitable units of apparatus 1700 to perform corresponding functions according one or more embodiments of the present disclosure.

As illustrated in FIG. 15, apparatus 1600 includes receiving module 1602 configured to receives requests for a pattern for performing a set of idle/inactive mode procedures and receive gap configurations according to any of the embodiments and examples described herein. Determining module 1604 is configured to determine a pattern for performing a set of idle/inactive mode procedures according to any of the embodiments and examples described herein. Transmitting module 1606 is configured to transmit a pattern for performing a set of idle/inactive mode procedures and/or an indication of an availability of such a pattern, according to any of the embodiments and examples described herein.

As illustrated in FIG. 15, apparatus 1700 includes receiving module 1702 configured to receive a pattern for performing a set of idle/inactive mode procedures and/or an indication of an availability of such a pattern, according to any of the embodiments and examples described herein. Determining module 1704 is configured to determine a gap configuration according to any of the embodiments and examples described herein. Transmitting module 1706 is configured to transmit a gap configuration, a request for a pattern for performing a set of idle/inactive mode procedures, and/or a pattern for performing a set of idle/inactive mode procedures, according to any of the embodiments and examples described herein.

Figure 16:
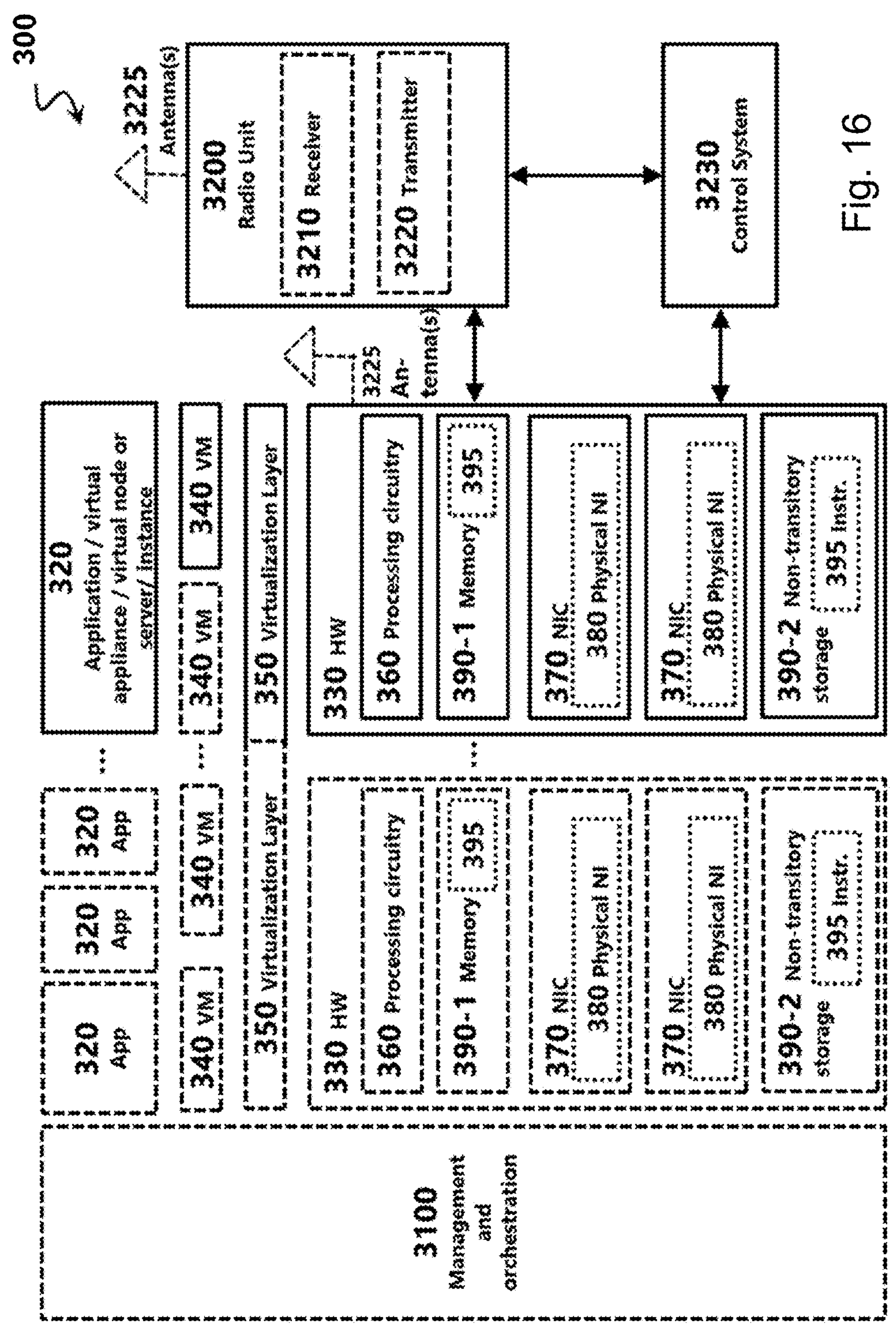
FIG. 16 illustrates an example virtualization environment, according to certain embodiments.

FIG. 16 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 16, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV. Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 17:
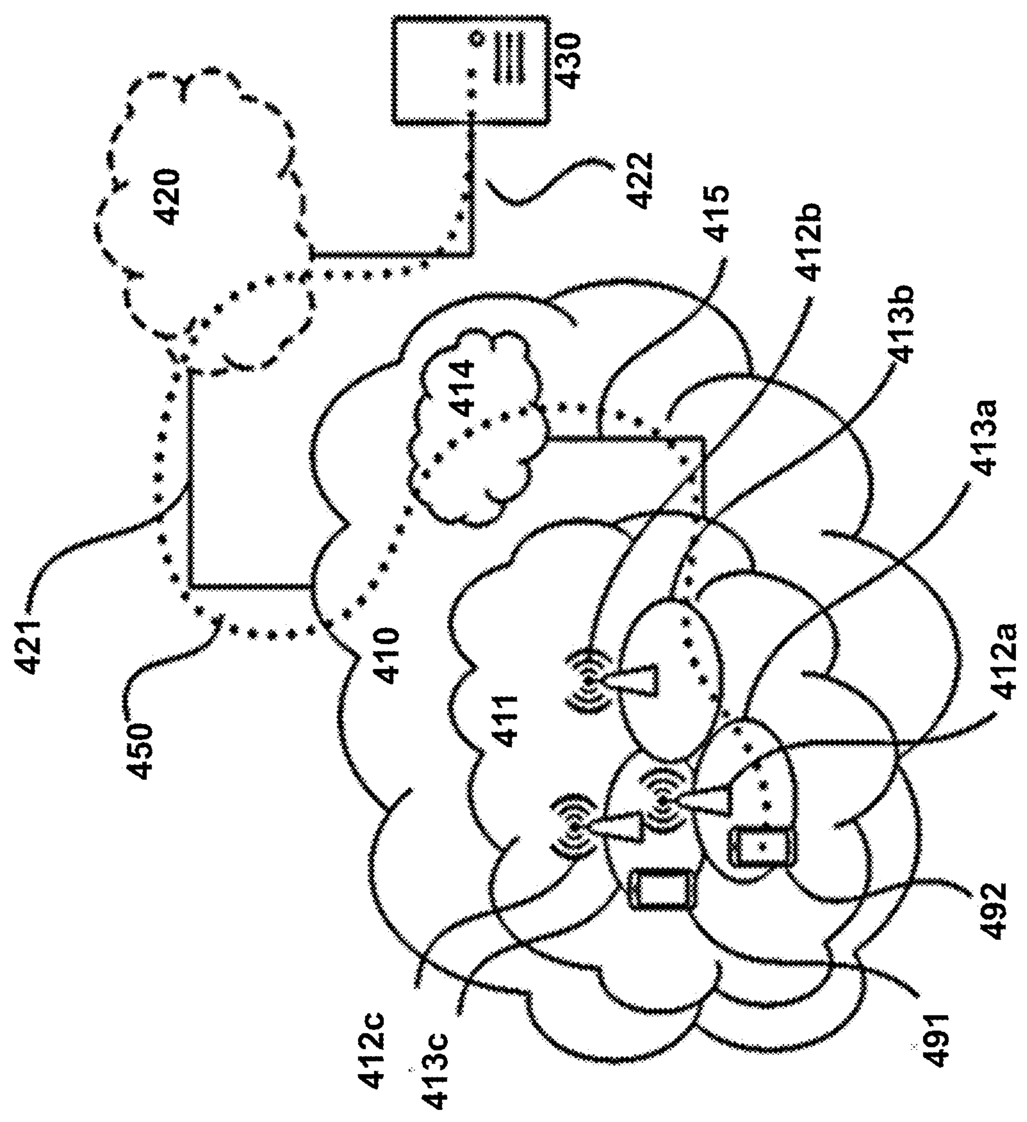
FIG. 17 illustrates an example telecommunication network connected via an intermediate network to a host computer, according to certain embodiments.

With reference to FIG. 17, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 17 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 18:
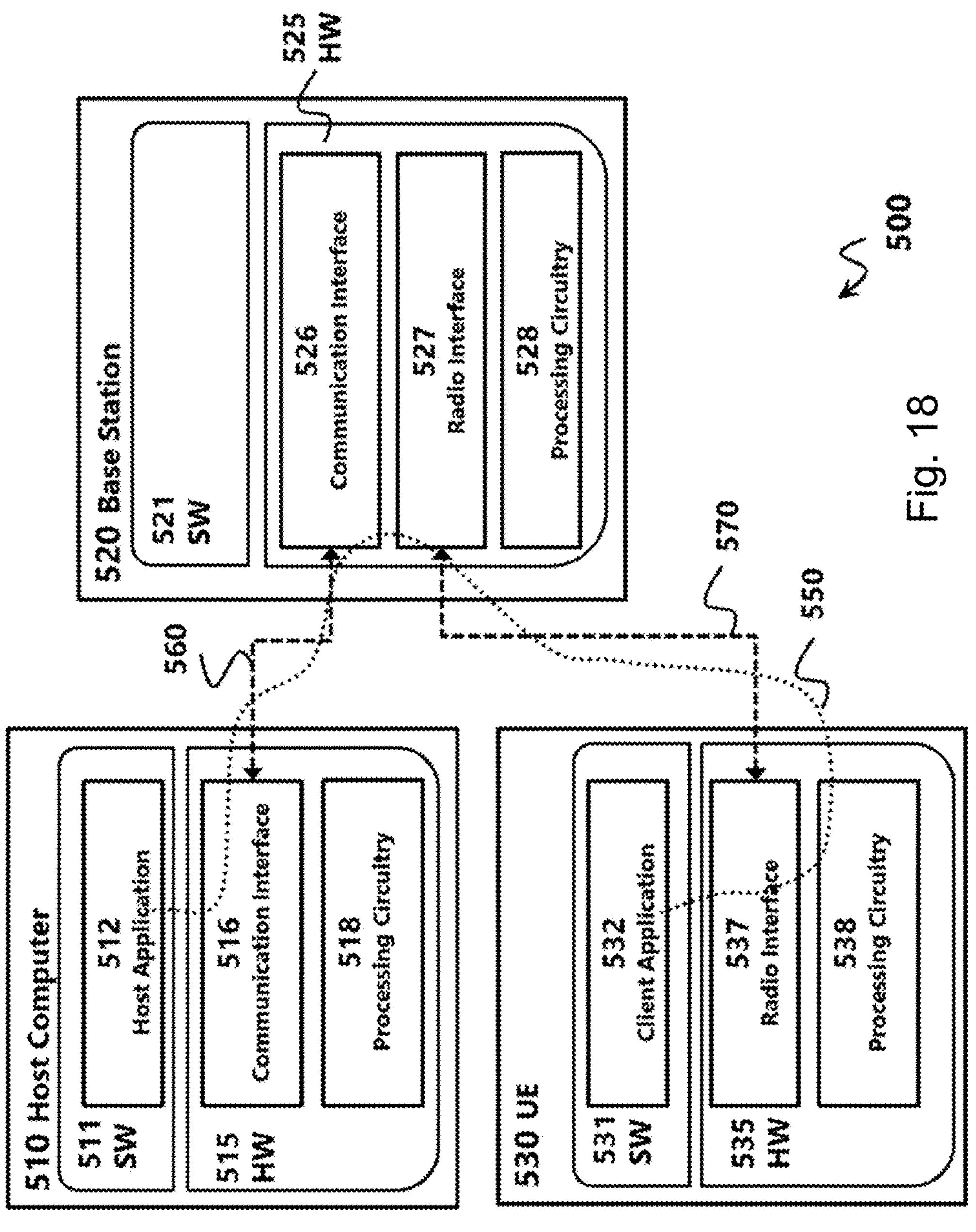
FIG. 18 illustrates an example host computer communicating via a base station with a user equipment over a partially wireless connection, according to certain embodiments.

FIG. 18 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 18. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 18) served by base station 520. Communication interface 526 may be configured to facilitate connection 560 to host computer 510. Connection 560 may be direct, or it may pass through a core network (not shown in FIG. 18) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 18 may be similar or identical to host computer 430, one of base stations 412*a*, 412*b*, 412*c* and one of UEs 491, 492 of FIG. 16, respectively. This is to say, the inner workings of these entities may be as shown in FIG. 18 and independently, the surrounding network topology may be that of FIG. 16.

In FIG. 18, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 19:
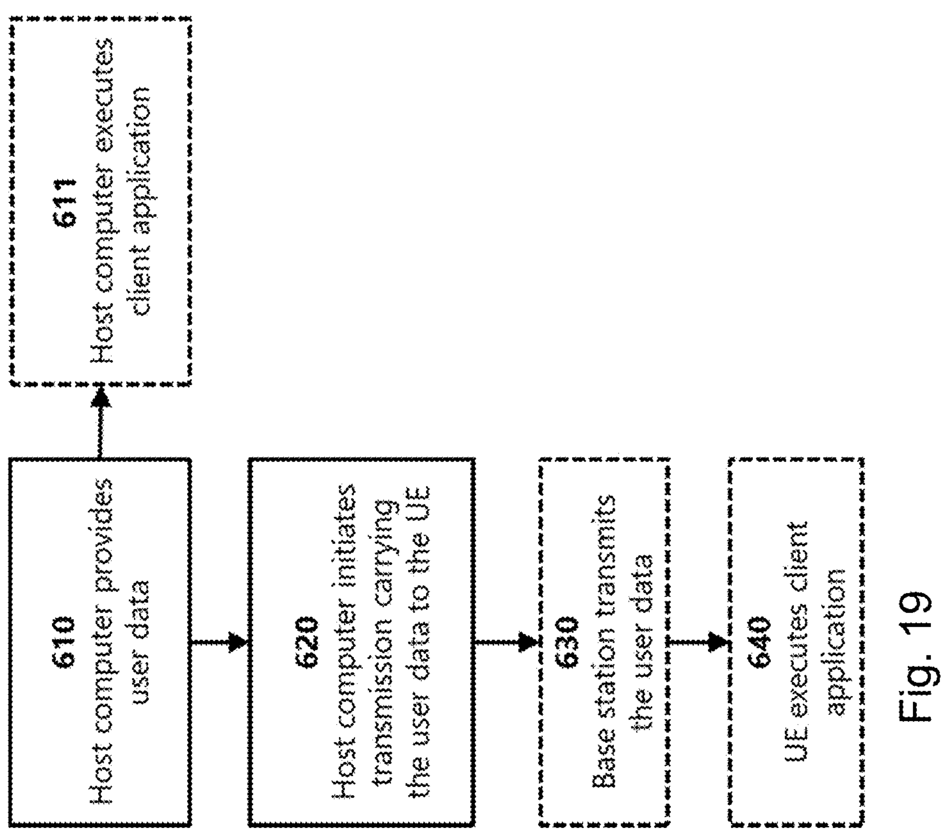
FIG. 19 is a flowchart illustrating a method implemented, according to certain embodiments.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 20:
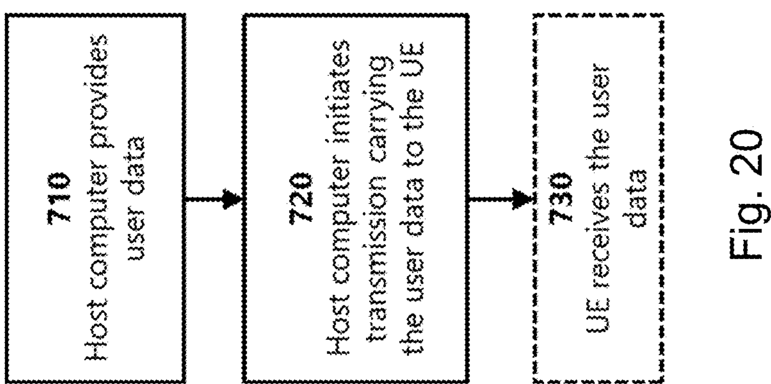
FIG. 20 is a flowchart illustrating a method implemented in a communication system, according to certain embodiments.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 21:
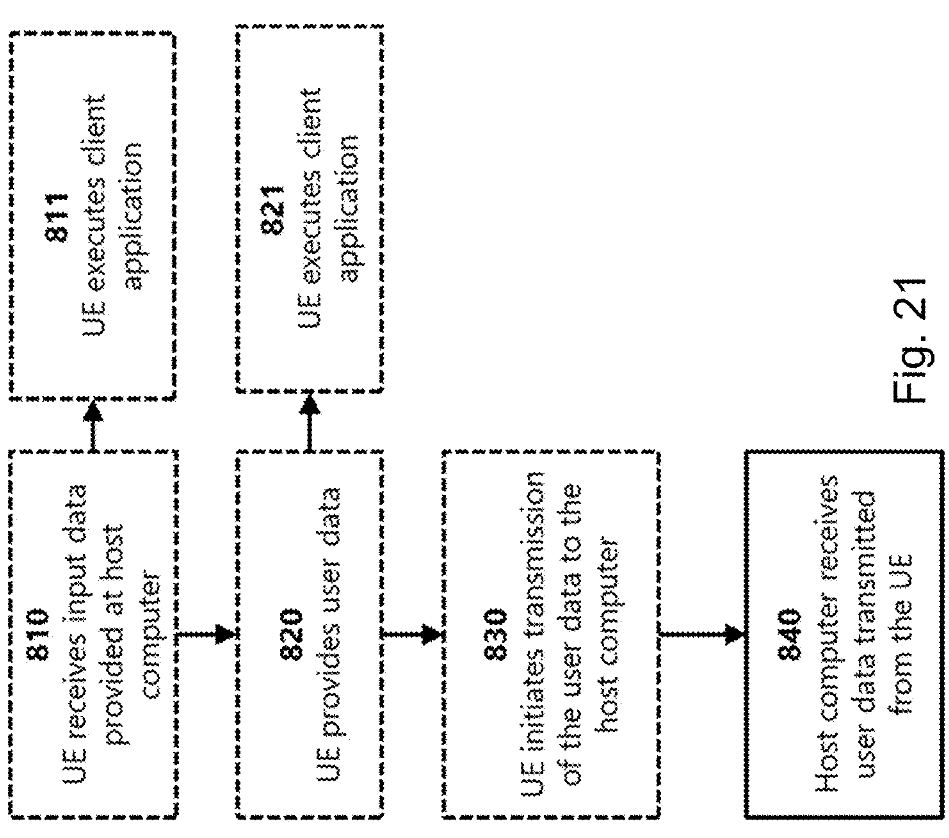
FIG. 21 is a flowchart illustrating a method implemented in a communication system, according to certain embodiments.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 22:
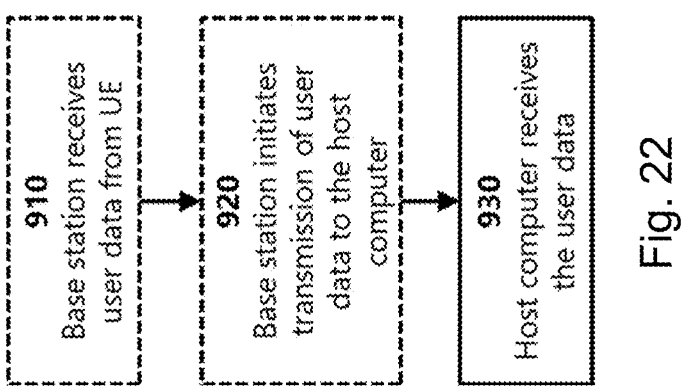
FIG. 22 is a flowchart illustrating a method implemented in a communication system, according to certain embodiments.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

The invention claimed is:

1. A method performed by a wireless device operating in both a first network and a second network, the method comprising:

determining a pattern for performing procedures in the second network; and upon transition of the wireless device from an inactive/idle state to a connected state in the first network, transmitting an indication of the determined pattern to the first network.

2. The method of claim 1, further comprising receiving a gap configuration from the first network node, wherein the gap configuration is based on the pattern.

3. The method of claim 2, further comprising upon transition of the wireless device to an idle/inactive state in the first network, releasing the gap configuration.

4. The method of claim 1, further comprising:

transmitting an indication to the first network that the wireless device has determined the pattern for performing the procedures in the second network; and receiving a request from the first network for the determined pattern.

5. The method of claim 1, wherein transmitting the indication of the determined pattern comprises transmitting a radio resource control (RRC) message.

6. A wireless device capable of operating in both a first network and a second network, the wireless device comprising processing circuitry operable to:

determine a pattern for performing procedures in the second network; and upon transition of the wireless device from an inactive/idle state to a connected state in the first network, transmit an indication of the determined pattern to the first network.

7. The wireless device of claim 6, the processing circuitry further operable to receive a gap configuration from the first network node, wherein the gap configuration is based on the pattern.

8. The wireless device of claim 7, the processing circuitry further operable to, upon transition of the wireless device to an idle/inactive state in the first network, release the gap configuration.

9. The wireless device of claim 7, wherein the processing circuity is operable to receive the gap configuration by receiving one of a RRC resume, RRC setup, and RRC reconfiguration message.

10. The wireless device of claim 7, wherein the wireless device comprises a multi-SIM wireless device.

11. The wireless device of claim 6, the processing circuitry further operable to:

transmit an indication to the first network that the wireless device has determined the pattern for performing the procedures in the second network; and receive a request from the first network for the determined pattern.

12. The wireless device of claim 6, wherein the processing circuity is operable to transmit the indication of the determined pattern by transmitting a radio resource control (RRC) message.

13. The wireless device of claim 12, wherein the RRC message comprises one of a RRC resume request, RRC setup request, RRC resume complete, RRC setup complete message, and RRC user equipment (UE) assistance information.

14. The wireless device of claim 6, wherein the determined pattern is based on one or more of the following procedures in the second network: paging frames and paging occasions configured for the wireless device, discontinuous reception (DRX) cycle, periods for performing measurements, and periodic registration area updates.

15. The wireless device of claim 6, wherein the determined pattern comprises a set of time domain windows.

16. A method performed by a first network node in a first network serving a first wireless device, wherein the wireless device is also operating in a second network, the method comprising:

receiving, from the wireless device transitioning from an idle/inactive state to a connected state in the first network, a pattern for performing procedures in the second network; and upon the wireless device transitioning to an idle/inactive state in the first network, storing the pattern.

17. A network node capable of operating in a first network serving a first wireless device, wherein the wireless device is also operating in a second network, the network node comprising processing circuitry operable to:

receive, from the wireless device transitioning from an idle/inactive state to a connected state in the first network, a pattern for performing procedures in the second network; and upon the wireless device transitioning to an idle/inactive state in the first network, store the pattern.

18. The network node of claim 17, the processing circuitry further operable to:

determine a gap configuration based on the pattern; and transmit the gap configuration to the wireless device.

19. The network node of claim 18, wherein the processing circuitry is operable to transmit the gap configuration by transmitting one of a RRC resume, RRC setup, and RRC reconfiguration message.

20. The network node of claim 17, wherein the processing circuitry is operable to store the pattern by storing the pattern in an access stratum (AS) context for the wireless device.

21. The network node of claim 17, wherein the processing circuitry is operable to receive the pattern by receiving one of a RRC resume request, RRC setup request, RRC resume complete, RRC setup complete message, and RRC user equipment (UE) assistance information.

22. The network node of claim 17, the processing circuitry further operable to, upon the wireless device connecting to a second network node in the first network, transmit the pattern to the second network node.

23. The network node of claim 22, wherein the processing circuitry is operable to transmit the pattern to the second network node by transmitting a retrieve context response message.

24. The network node of claim 17, the processing circuitry further operable to transmit the pattern to a core network node.

25. The network node of claim 24, wherein the processing circuitry is operable to transmit the pattern to the core network node by transmitting one of a path switch request, radio resource control (RRC) inactive transition report and a context release request.

26. The network node of claim 17, wherein the pattern is based on one or more of the following procedures in the second network: paging frames and paging occasions configured for the wireless device, discontinuous reception (DRX) cycle, periods for performing measurements, and periodic registration area updates.

* * * * *